United States Patent
Oguguo et al.

(10) Patent No.: US 10,924,044 B2
(45) Date of Patent: Feb. 16, 2021

(54) FEED-FORWARD CONTROL SYSTEM AND METHOD FOR GENSET QUICK COLD START

(71) Applicant: Cummins Power Generation Limited, Kent (GB)

(72) Inventors: Ikenna Oguguo, Kent (GB); Philippe Goesel, Kent (GB)

(73) Assignee: Cummins Power Generation Limited, Kent (GB)

( * ) Notice: Subject to any disclaimer, the term of this patent is extended or adjusted under 35 U.S.C. 154(b) by 0 days.

(21) Appl. No.: 15/760,524

(22) PCT Filed: Sep. 19, 2016

(86) PCT No.: PCT/GB2016/052909
§ 371 (c)(1),
(2) Date: Mar. 15, 2018

(87) PCT Pub. No.: WO2017/051155
PCT Pub. Date: Mar. 30, 2017

(65) Prior Publication Data
US 2018/0262139 A1  Sep. 13, 2018

(30) Foreign Application Priority Data
Sep. 24, 2015 (GB) .................................... 1516915

(51) Int. Cl.
*H02P 9/08* (2006.01)
*F02D 29/06* (2006.01)
(Continued)

(52) U.S. Cl.
CPC ............... *H02P 9/08* (2013.01); *F01M 5/00* (2013.01); *F01P 7/167* (2013.01); *F02D 29/06* (2013.01);
(Continued)

(58) Field of Classification Search
CPC ......... B60W 10/06; B60W 2510/0638; B60W 2710/0666; F01M 2005/008; F01M 5/00;
(Continued)

(56) References Cited

U.S. PATENT DOCUMENTS 3,917,027 A * 11/1975 Hakanson ................ F01M 5/00
                                                         123/179.31
4,341,071 A *  7/1982 Abo ............................ F02C 9/28
                                                         60/39.281
(Continued)

FOREIGN PATENT DOCUMENTS

EP  2 192 292   11/2008
EP  2 067 646   6/2009

OTHER PUBLICATIONS

GB Search Report for Patent Application No. GB1516915.4, dated Mar. 20, 2017, 4 pages.
(Continued)

*Primary Examiner* — Yuhui R Pan
(74) *Attorney, Agent, or Firm* — Foley & Lardner LLP

(57) ABSTRACT

A method of reducing cold startup time of a genset which includes an engine and a generator for providing a requested power to a utility grid or load comprises determining if the generator is electrically coupled to a utility grid or load. In response to determining the generator is electrically coupled to the utility grid or load, a speed bias value is controlled in response to the power being produced by the genset. The speed bias signal represents a difference between a target power output and a current power output of the genset. The power of the engine is controlled using the speed bias value.

25 Claims, 17 Drawing Sheets

(51) Int. Cl.
*F01M 5/00* (2006.01)
*F01P 7/16* (2006.01)
*F02D 41/00* (2006.01)
*G05B 19/042* (2006.01)
*H02P 9/04* (2006.01)

(52) U.S. Cl.
CPC ..... *F02D 41/0007* (2013.01); *F02D 41/0097* (2013.01); *G05B 19/042* (2013.01); *H02P 9/04* (2013.01); *F01M 2005/008* (2013.01); *F02D 41/005* (2013.01); *F02D 2200/101* (2013.01)

(58) Field of Classification Search
CPC .... F01P 7/167; F02D 2200/101; F02D 29/06; F02D 41/0007; F02D 41/005; F02D 41/0097; G05B 19/042; H02P 9/04; H02P 9/08

See application file for complete search history.

(56) References Cited

U.S. PATENT DOCUMENTS

| | | | |
|---|---|---|---|
| 5,552,640 A * | 9/1996 | Sutton | H02P 9/04 290/40 B |
| 7,276,806 B1 | 10/2007 | Sheidler et al. | |
| 7,915,868 B1 * | 3/2011 | Maters | F01D 25/00 322/29 |
| 10,202,886 B1 * | 2/2019 | Teslovich | F01P 5/12 |
| 2004/0007938 A1 | 1/2004 | Endo | |
| 2004/0163629 A1 * | 8/2004 | Strayer | F02D 41/062 123/491 |
| 2005/0206167 A1 | 9/2005 | Gehret, Jr. | |
| 2007/0084214 A1 * | 4/2007 | Schmidt | F01D 25/18 60/778 |
| 2009/0140521 A1 * | 6/2009 | Bryan | B60K 6/445 290/31 |
| 2011/0072801 A1 * | 3/2011 | Lupescu | F01N 3/031 60/287 |
| 2013/0249213 A1 * | 9/2013 | Oesterheld | H02P 9/08 290/31 |
| 2015/0159572 A1 * | 6/2015 | Knudsen | F02D 41/1446 60/605.1 |
| 2016/0123252 A1 * | 5/2016 | Yoshizaki | F02D 41/107 123/436 |

OTHER PUBLICATIONS

International Search Report and Written Opinion for PCT Application No. PCT/GB2016/052909, dated Jun. 9, 2017, 10 pages.

* cited by examiner

US 10,924,044 B2

FEED-FORWARD CONTROL SYSTEM AND METHOD FOR GENSET QUICK COLD START

TECHNICAL FIELD

The present disclosure relates generally to monitoring and control of generator sets (gensets).

BACKGROUND

Gensets are used extensively for power generation in locomotives, trucks, recreational vehicles, marine vessels as well as for grid power generation. Gensets normally include a prime mover such as an internal combustion (IC) engine that converts fuel into mechanical energy to rotate a generator (e.g., an alternator). The generator converts the mechanical energy into useable electrical energy at a line voltage and frequency most suitable for transmission and utilization.

Cold starting a genset generally includes starting a genset that has a cold exhaust which has not been run for a predetermined time (e.g., greater than 12 hours) due to genset being shut down. Cold starting a genset can involve a substantial time delay and transitory difficulties in control and lack of power output due to the cold start condition before the genset is operable to provide full power to a load which can include a utility grid network.

SUMMARY

In some embodiments, a method of reducing cold startup time of a genset, which comprises an engine and a generator, for providing power to a load comprises providing a lubricant to the genset at predetermined time intervals before a genset startup. The lubricant is heated to a predetermined lubricant temperature using an external heating system. A high temperature coolant of the genset is heated to greater than a predetermined high temperature coolant temperature. The speed of the engine is ramped to a target speed continuously without pausing at a speed lower than the target speed. Genset electrical parameters of the genset are synchronized to utility grid or load electrical parameters. The genset is electrically coupled to the utility grid or load such that the synchronizing and electrically coupling are performed within a predetermined synchronization time. A fueling rate and a spark timing is adjusted based on a power being produced by the genset.

In some embodiments, the method also includes controlling a speed bias value which represents a difference between a target power output and a current power output of the genset in response to the power being produced by the genset. In some embodiments, a total time from cold starting the genset to providing the power requested of the genset is less than a predetermined cold start time. In particular embodiments, the predetermined cold start time is 75 seconds. In some embodiments, the method also includes heating a low temperature coolant of the genset to a predetermined low temperature coolant temperature before genset startup. In some embodiments in which the genset also comprises a turbocharger system, the method also includes providing a turbine nozzle ring of the turbocharger system. The turbine nozzle ring is structured to provide a pressure drop thereacross sufficient to cause the turbocharger system to produce a target power output within a load ramp time of less than 40 seconds.

In some embodiments, the predetermined time interval for providing lubricant to the genset is in the range of 5 minutes to 10 minutes. Furthermore, the predetermined lubricant temperature can be greater than 50 degrees Celsius. In some embodiments, the providing of the lubricant at the predetermined time intervals sufficiently lubricates the engine in less than 5 seconds, the heating of lubricant to the predetermined lubricant temperature is achieved within a lubricant heating time of equal to or less than 15 seconds, the predetermined synchronization time is equal to or less than 10 seconds, and the adjusting of the fueling rate and the spark timing and controlling the speed bias in response to the power being produced by the genset causes a power ramp time of the genset to be equal to or less than 45 seconds.

In some embodiments, the method also includes setting a speed bias upper limit to be in the range of +6% to +10%. In some embodiments, in which the genset also includes a turbocharger system including a single turbocharger and a throttle structured to selectively provide exhaust gas to the turbocharger for operating the turbocharger, the method further includes maintaining the speed bias value within the speed bias upper limit in response to a time duration between the throttle opening and a corresponding increase in power provided by the turbocharger exceeding a predetermined time threshold. In various embodiments, the predetermined high temperature coolant temperature is greater than 80 degrees Celsius.

In some embodiments, a genset comprises an engine, a generator including a circuit breaker electrically coupleable to a load or utility grid, a lubricant system, a lubricant heating system, a speed control system, a high temperature coolant system, a fuel system, an ignition system, a turbocharger system, and a controller. The controller is configured to generate a lubricant control signal configured to cause the lubricant system to provide a lubricant to the genset at predetermined time intervals before a genset startup. The controller generates a lubricant heating signal configured to cause the lubricant heating system to heat the lubricant to a predetermined lubricant temperature. The controller also generates a high temperature coolant system control signal configured to cause the high temperature coolant system to heat a high temperature coolant of the genset to greater than a predetermined high temperature coolant temperature. The controller generates a speed control signal configured to cause the speed control system to ramp the speed of the genset to a target speed continuously without pausing at a speed lower than the target speed. The controller also generates a synchronizing signal configured to cause the generator to synchronize genset electrical parameters of the genset to utility grid or load electrical parameters of the utility grid or load. The controller further generates a circuit breaker control signal configured to cause the circuit breaker to close to electrically couple the generator to the load or utility grid such that the synchronizing and electrically coupling is performed within a predetermined synchronization time. The controller generates a fuel system control signal configured to cause the fuel system to adjust a fueling rate based on a power being produced by the genset. The controller also generates an ignition system control signal configured to cause the ignition system to adjust spark timing based on the power being produced by the genset.

In some embodiments, the controller is further configured to generate a speed bias signal instructing the speed control system to control a speed bias value, which represents a difference between a target power output and a current power output of the genset, in response to the power being produced by the genset. In some embodiments, a total time from cold starting the genset to providing the power requested of the genset is less than a predetermined cold start time. In some embodiments, the predetermined cold start time is 75 seconds. In some embodiments, the turbocharger system includes a turbine nozzle ring structured to provide a pressure drop thereacross sufficient to cause the turbocharger system to produce a target power output within a load ramp time of less than 40 seconds.

In some embodiments, the predetermined lubricant temperature is greater than 50 degrees Celsius. In various embodiments, providing the lubricant at the predetermined time intervals sufficiently lubricates the engine in less than 5 seconds, the heating of lubricant to the predetermined lubricant temperature is achieved within a lubricant heating time of equal to or less than 15 seconds, the predetermined synchronization time is equal to or less than 10 seconds, and the adjusting the fueling rate and spark timing and controlling a speed bias in response to the power being produced by the genset causes a power ramp up time of the genset to be equal to or less than 45 seconds.

In some embodiments, a control device for reducing a cold start time of a genset which includes an engine, a generator including a circuit breaker electrically coupleable to a load or utility grid, a lubricant system, a lubricant heating system, a speed control system, a high temperature coolant system, a fuel system, an ignition system, and a turbocharger system, comprises a controller comprising circuitry configured to generate a lubricant control signal instructing the lubricant system to provide a lubricant to the genset at predetermined time intervals before a genset startup. The controller generates a lubricant heating signal instructing the lubricant heating system to heat the lubricant to a predetermined lubricant temperature. The controller also generates a high temperature coolant system control signal instructing the high temperature coolant system to heat a high temperature coolant of the genset to greater than a predetermined high temperature coolant temperature. The controller generates a speed control signal instructing the speed control system to ramp the speed of the genset monotonically to a target speed. The controller generates a synchronizing signal instructing the generator to synchronize genset electrical parameters of the genset to utility grid or load electrical parameters of the utility grid or load. The controller also generates a circuit breaker control signal instructing the circuit breaker to close to electrically couple the generator to the utility grid or load such that the synchronizing and electrically coupling are performed within a predetermined synchronization time. The controller generates a fuel system control signal instructing the fuel system to adjust a fueling rate based on a power being produced by the genset. The controller further generates an ignition system control signal instructing the ignition system to adjust a spark timing based on the power being produced by the genset.

In some embodiments, the controller is further configured to generate a speed bias signal (e.g., under feed forward control) instructing the speed control system to control a speed bias value, which represents a difference between a target power output and a current power output of the genset, in response to the power being produced by the genset. In some embodiments, a total time from cold starting the genset to providing the power requested of the genset is less than a predetermined cold start time. In various embodiments, the predetermined cold start time is 75 seconds. In some embodiments, the turbocharger system includes a turbine nozzle ring structured to provide a pressure drop thereacross sufficient to cause the turbocharger system to produce a target power output within a load ramp time of less than 40 seconds. In some embodiments, the speed bias signal is configured to set a speed bias upper limit to be in the range of +6% to +10%. In some embodiments, the generation of the speed bias signal reverts to a time based or feedback control upon attaining a predetermined genset operating condition.

In some embodiments, a method of reducing cold startup time of a genset which includes an engine and a generator for providing a requested power to a utility grid or load comprises determining if the generator is electrically coupled to a utility grid load. In response to determining the generator is electrically coupled to the utility grid or load, a speed bias value is controlled in response to the power produced by the genset (e.g., in a feed forward control). The speed bias value represents a difference between a target power output and a current power output of the genset. The power of the engine is controlled using the speed bias value.

In some embodiments, the method also includes setting a speed bias upper limit to be in a range of +6% to +10%. In some embodiments, controlling the speed bias includes initiating the speed bias value at a speed bias upper limit. In some embodiments in which the genset also comprises an exhaust system, the method includes determining if an exhaust system temperature of the exhaust system is below a predetermined temperature threshold. In response to determining the exhaust system temperature is below the predetermined temperature threshold and the generator is electrically coupled to the load, the speed biasvalue of the genset for ramping a genset speed is controlled in response to the power being produced by the genset (e.g., utilizing feed forward control).

In some embodiments, the method also includes in response to determining the exhaust system temperature is above the predetermined temperature threshold, controlling the the speed bias value as based on time. In some embodiments, the predetermined temperature threshold is 400 degrees Celsius. In some embodiments, the method further includes determining whether a power provided by the genset is equal to a target power, and in response to determining the power provided by the genset is equal to the target power, the speed bias value is controlled based on time in a feedback control. In various embodiments, the method also includes reducing the speed bias value from the speed bias upper limit responsive to a power provided by the genset approaching a power requested of the genset which prevents the power provided by the genset from exceeding the power requested of the genset (e.g., to allow for transition from a power output based feed forward control to a time based feedback control).

In some embodiments in which the genset further comprises a single turbocharger and a throttle structured to selectively provide exhaust gas to the turbocharger for operating the turbocharger, the method further comprises maintaining the the speed bias value within the speed bias upper limit in response to a time duration between the throttle opening and a corresponding increase in power provided by the turbocharger exceeding a predetermined time threshold. In some embodiments, the method also includes providing a lubricant to the engine at predetermined time intervals before a genset startup. In some embodiments, the method also includes heating a high temperature coolant of the genset to a predetermined high temperature coolant temperature.

In some embodiments, a genset comprises an engine, a generator including a circuit breaker electrically coupleable to a utility grid or load, a speed control system and a controller. The controller is configured to determine if the generator is electrically coupled to the utility grid load. In response to determining the generator is electrically coupled to the utility grid or load, the controller generates speed bias data configured to cause the speed control system to control a value of the speed bias value in response to the power produced by the genset. The speed bias value represents a difference between a target power output and a current power output of the genset. The controller controls the power of the engine using the speed bias value.

In some embodiments, the controller is further configured to set a speed bias upper limit to be in a range of +6% to +10%. In some embodiments, controlling the speed bias includes initiating the speed bias value at a speed bias upper limit. In various embodiments, the genset further comprises an exhaust system and the controller is further configured to determine if an exhaust system temperature of the exhaust system is below a predetermined temperature threshold. In response to determining the exhaust system temperature is below the predetermined temperature threshold and the generator is electrically coupled to the load, the controller controls the speed bias value as in response to the power produced by the genset.

In some embodiments, in response to determining the exhaust system temperature is above the predetermined temperature threshold, the controller is further configured to control the speed bias value based on time. In some embodiments, the predetermined temperature threshold is 400 degrees Celsius. In various embodiments, the controller is further configured to determine whether a power provided by the genset is equal to a target power. In response to determining the power provided by the genset is equal to the target power, the controller generates a second speed bias value based on time. In some embodiments, the controller is further configured to reduce the value of the speed bias signal from the speed bias upper limit responsive to a power provided by the genset approaching a power requested of the genset which prevents the power provided by the genset from exceeding the power requested of the genset.

In some embodiments, the genset further comprises a single turbocharger and a throttle structured to selectively provide exhaust gas to the turbocharger for operating the turbocharger, and the controller is further configured to maintain the speed bias value within the speed bias upper limit in response to a time duration between the throttle opening and a corresponding increase in power provided by the turbocharger exceeding a predetermined time threshold. In some embodiments, the genset further comprises a lubricant system, and the controller is further configured to generate a lubricant system control signal instructing the lubricant system to provide a lubricant to the engine at predetermined time intervals before genset startup. In various embodiments, the genset further comprises a high temperature coolant system, and the controller is further configured to generate a high temperature coolant control signal instructing the high temperature coolant system to heat a high temperature coolant of the genset to a predetermined high temperature coolant temperature before genset startup.

In some embodiments, a control device for reducing a cold start time of a genset which includes an engine, a generator including a circuit breaker electrically coupleable to a utility grid or load and a speed control system, comprises a controller communicatively coupled to each of the generator, the circuit breaker and the speed control system. The controller comprises circuitry configured to determine if the generator is electrically coupled to a utility grid or load. In response to determining the generator is electrically coupled to the utility grid or load, the controller generates speed bias data configured to cause the speed control system to control a value of the speed bias value in response to the power produced by the genset. The speed bias signal represents a difference between a target power output and a current power output of the genset. The controller controls the power of the engine using the speed bias value. In some embodiments, the controller is further configured to set a speed bias upper limit to be in a range of +6% to +10%. In some embodiments, the controller is configured to initiate the speed bias value at a speed bias upper limit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 13A is showing the amount of time taken to ramp a genset power to a target power to produce a target power by controlling a speed bias value based on time and using normal fueling rate and normal spark timing (FIG. 13A). FIG. 13B is showing the amount of time taken to ramp a genset power to a target power to produce a target power by controlling a speed bias value in response to power requested by the genset and using a modified fueling rate and modified spark timing.

Figure 1:
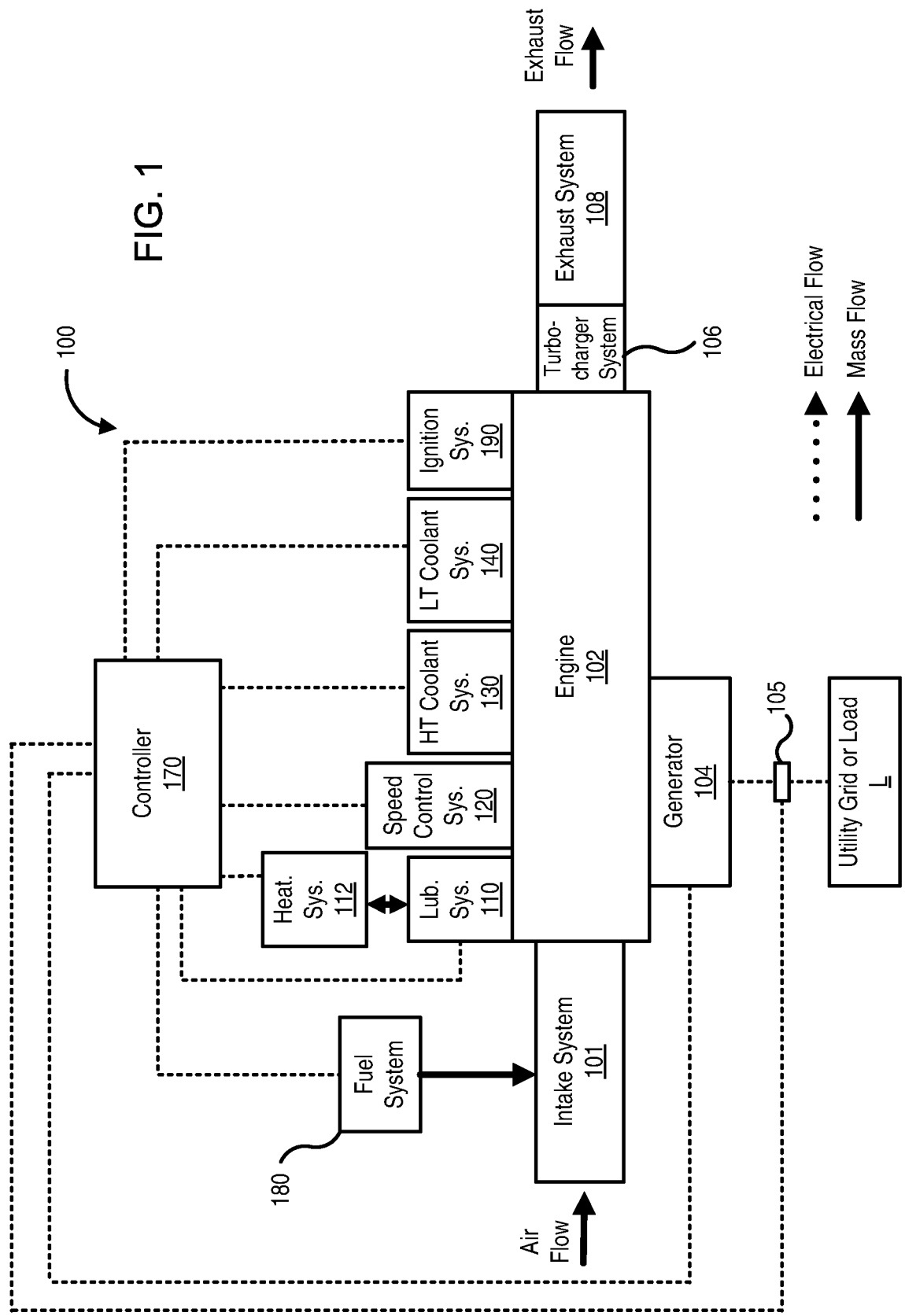
FIG. 1 is a schematic block diagram of a genset, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Cold starting a genset generally includes starting a genset that has a cold exhaust which has not been run for a predetermined time (e.g., greater than 12 hours) due to genset being shut down. High efficiency gensets often include single or multiple turbochargers that use the exhaust gas to produce supplemental power for reaching a desired power load requested by a load. During cold start, the temperature and, therefore, thermal and kinetic energy of the exhaust gas is low. Thus, lower energy is available for the turbocharger to spin up to operating revolutions and to boost power, which leads to a lack of turbo pressure boost in the intake and a resulting turbo lag problem. The turbo lag is generally represented as a time delay between when a throttle of the turbocharger is opened to insert exhaust gas into the turbocharger to when a target turbo power is actually produced by the turbocharger. This lack of turbocharged pressure boost in the intake due to a cold engine and exhaust can lead to a significant delay from the time when the genset is cold started to when the target power requested by the load is actually produced by the genset when operated using time based or feedback control (such as a PID or PI controller) configured for control of an engine at full operating temperature and steady state conditions. Other challenges also arise in cold genset startup which can lead to significant delay between genset startup and the target power actually produced by the genset. These include, but are not limited to, speed bias control lag (delay in applying the required speed bias or throttle control input) and overshoot (under damped control overshoot as increased inputs in speed bias or throttle control are applied by the feedback control due to lack of system response under cold start conditions).

Cold startup can cause various problems, particularly in situations where a load request has to be met in a short amount of time. In various gensets, such as lean burn natural gas (LBNG) gensets, rapid ramping of power is difficult and often leads to power output overshoot as the power produced by the genset exceeding a power requested by the load, which is undesirable. Gensets may use a time dependent or feedback control approach for controlling a speed bias value (e.g., representative of a difference between a target power output and a current power output produce by the genset). The time based approach may be suitable for slow startup applications where the exhaust manifold has time to raise to sufficient temperatures during the idle time when the oil and coolant are being raised to an appropriate temperature. In particular, this warm up period allows the exhaust and turbocharger to warm up to operating conditions to provide a full intake pressure boost (turbochargers derive their power to compress the intake air and increase its pressure from both the kinetic and thermal energy of the exhaust, a lack of thermal energy in the exhaust during start up therefore will limit the turbo rpms and thus amount of intake pressure boost available for a given exhaust flow rate) and for fueling conditions to normalize (cold engine conditions generally require a richer air fuel mixture than would be required at or near warmed up steady state operating conditions to provide an equivalent power output) However, during quick start applications where the genset has to produce a requested load within a predetermined time, the time dependent approach may not yield sufficient power within the requested timeframe as the genset is still transitioning to a warm or steady state operating condition.

Various genset applications demand that the genset is able to provide full power requested by the load or utility grid within a predetermined time from genset startup. For example, the short term operating reserve scheme (STOR) demands of the United Kingdom national grid requires that a genset be able to provide full power requested by the utility grid from startup in less than 75 seconds, and additionally from the close of a circuit breaker of the genset to the utility grid to full power in less than 60 seconds. While these time limits can be met during cold start using multi-turbocharger gensets, such multi-turbo gensets often have lower operating efficiency. Single turbocharger gensets, on the other hand, have a higher operating efficiency but generally take a longer time to provide full power when starting cold due to a narrower operating range and an increased reliance on the thermal energy of the exhaust.

Embodiments described herein relate generally to systems and methods for reducing a quick cold start time, or a time between starting a genset and producing a full power to meet a power requested by a load. In various embodiments, the systems and methods described herein relate to addressing various operational parameters of the genset during one or more of a pre-start stage, speed ramp stage, load synchronization stage, and/or power ramp stage of the genset to reduce the quick cold start time so that a full power requested by the load can be delivered within a predetermined time. Furthermore, systems and methods described herein are also configured to increase a turbo output of a turbocharger included in the genset during cold start.

Embodiments of the systems and methods described herein for reducing a cold start time of a genset may include providing a lubricant to the genset at predetermined time interval before the genset has started. This prelubricates the engine, thereby reducing the time generally taken by gensets to achieve sufficient lubrication after startup, for example to less than 5 seconds. The lubricant is preheated, for example, while the genset is shutdown using an external heat source so that idling of an engine (e.g., at 900 rpm) during an acceleration stage of the engine, which is generally performed to heat the lubricant to desired temperature, is excluded. Since idling is not performed, the speed of the engine may be ramped to a target speed continuously or monotonically without pausing at a speed (e., 900 rpm) lower than a target speed (e.g., 1,500 rpm), in some implementations. In some implementations, the engine speed may be paused during the ramp up to the target speed for one or more small pauses, for example spanning a time duration which is a below a predetermined pause time threshold (e.g., less than a second); such activity may still be considered as a continuous ramping without pausing for the purposes of the present disclosure.

A high temperature coolant of the genset may additionally or alternatively be heated to greater than a predetermined high temperature (HT) coolant threshold before startup, providing a higher engine temperature and reducing heat loss during load ramp up. Generally, the HT coolant may be maintained at lower temperature than the predetermined HT coolant temperature threshold before engine startup. After engine startup, the temperature of the HT coolant increases to at or near the predetermined HT coolant temperature threshold, which can take significant time and result in heat and energy losses. By preheating the HT coolant to have a temperature above the predetermined HT coolant temperature threshold, the time to increase the engine speed to a target speed to produce a target power output is further reduced. Similarly, a low temperature (LT) coolant can be also be heated before genset startup, in some embodiments. In some implementations, the systems and methods described herein are also configured to continuously or monotonically ramp a turbocharger flow or otherwise a speed of a turbocharger (e.g., a single turbocharger) included in the genset. Furthermore, the systems and methods described herein can also increase a turbo output of the turbocharger on cold startup.

Embodiments of the systems and methods described herein may also include synchronizing a generator of the genset with the utility grid using a smaller matching phase window and shorter phase matching dwell time within which closing of a circuit breaker of the genset is to accomplish the synchronization within a predetermined synchronization time (e.g., less than 10 seconds). A fueling rate of the fueling system may be increased in some implementations, thereby providing a richer fuel to the engine during a power ramp stage of the genset. Spark timing may also be slowed. In various embodiments, any of the gensets described herein may include a single turbocharger. The turbocharger may include a turbine nozzle ring of structured to provide a pressure drop thereacross. The pressure drop may be sufficient to cause the turbocharger system to produce a target turbo load within a load ramp time of less than 40 seconds.

In various embodiments, systems and methods described herein relate to controlling a speed bias value used to ramp a speed of an engine included in the genset to a target speed to produce a target power corresponding to a power requested by a load in response to the power produced by the genset. In other embodiments, the pre-start and initial operating conditions and systems of the genset are controlled to decrease overall genset start time and/or increase the amount of intake pressure boost that the turbocharger can provide under cold start conditions or to minimize the required transition time for exhaust temperature or turbocharger power output to near or approximate that of steady state operation.

Embodiments of the systems and methods described herein for reducing a cold start time of a genset, for example a single turbocharger genset, a multi-turbocharger genset, a LBNG genset, a diesel powered genset, or any other genset include controlling the speed bias value in response to power requested from the load, such as in a feed forward control system. In some implementations, controlling the speed bias value in response to power produced by the genset may provide a shorter startup time by instantly starting the engine at maximum speed bias or a speed bias upper limit, or by utilizing a historically or empirically determined speed bias or throttle value to gain the requested power output. The systems and methods described herein, in some embodiments, control the engine speed using a speed bias value in response to power produced by the genset when a generator of the genset is electrically coupled to the load and an exhaust system temperature is below a predetermined temperature threshold (e.g., 400 degrees Celsius). The speed bias value may be provided as a throttle input to the engine (e.g., as a variable based upon which a circuit/controller varies a throttle level) and is, thereby used to increase or decrease a speed or a torque output of an engine included in the genset.

The predetermined temperature threshold can represent a temperature at or above which the temperature and kinetic energy of the exhaust gas is sufficient to allow the air fuel mixture, speed bias value or throttle value to approximate values required by a steady state or warm operating condition, and/or for the turbocharger (e.g., a single turbocharger or multiple turbochargers) to experience a delay (e.g., corresponding to a time between opening of a throttle of the turbocharger and a corresponding increase in power provided by the turbocharger) that is sufficiently short, or an intake pressure boost, or turbo rpm that is approximate that expected of steady state operation. Thus, in some embodiments, if a target power corresponding to the power requested by the load is reached by the genset and/or the exhaust system temperature is above the predetermined temperature threshold (e.g., greater than 400 degrees Celsius), the systems and methods described herein allow transition to a control of the speed bias value based on time or feedback control. In various embodiments, an upper speed bias limit is set within the range of +6% to +10% of that required to produce the requested power output.

It is to be appreciated that the systems and methods described herein can be used to selectively start gensets during cold startup conditions. For example, in some implementations the systems and methods described herein can sense a cold start condition (e.g., a temperature of an exhaust manifold less than a predetermined temperature) and operate the genset using the systems and methods described herein in only those conditions. If cold startup conditions do not exist, the genset can be started using any other suitable protocol or method. Further, in some implementations, features described herein, such as a feed-forward control in which a speed bias is controlled in response to power produced by the genset, may be used temporarily until the genset is started and at near or approximate steady state operating conditions. Once the genset reaches a target output and/or running condition, control may transition or revert to a different type of control, such as a feedback method (such as from a PID control, a PI control, or other feedback related control system) in which the speed bias of the steady state operating condition genset is controlled based on time.

Embodiments of the systems and methods described herein for reducing a cold starting time of a genset may provide several benefits including, for example: (1) significantly reducing the cold start time of a genset, for example less than 75 seconds, thereby swiftly meeting a load demand; (2) providing power from cold start within a short time while still maintain high efficiency by allowing high efficiency gensets, such as single turbocharger gensets, to provide a target power corresponding to a power requested of the genset from cold start within a predetermined cold start time; (3) providing control of the rate of power demanded of the genset during power ramp up, thereby maintaining better stability; (4) minimizing power overshoot of the power produced by the genset relative to the power requested by the load or utility grid, thereby further enhancing genset stability; (5) allowing switching between controlling speed bias in response to power produced by the genset or based on time depending on operating conditions of the genset (e.g., only during cold startup conditions); (6) starting ramping up of engine speed at maximum speed bias which is reduced as a power delivered by the genset approaches a target power, thereby preventing the power provided by the genset from exceeding the power requested of the genset; (7) allowing maintaining of the speed bias at an upper limit even if there is a delay in attaining the required turbocharger intake pressure boost and/or turbocharger RPM and the target power provided by the genset; and/or (8) providing a short time to ramp speed of the genset to synchronous speed and to produce a target power while providing full control of torque increase at various load levels; and/or (9) selectively allowing startup of gensets using the systems and methods described herein only when certain conditions are met, for example selectively during cold startup conditions.

FIG. 1 is a schematic block diagram of a genset 100. The genset 100 includes an engine 102 and a generator 104 including a circuit breaker 105 electrically coupleable to a load or utility grid L. The genset 100 also includes an intake system 101, a turbocharger system 106, an exhaust system 109, a lubricant system 110, a lubricant heating system 112, a speed control system 120, a HT coolant system 130, a low temperature (LT) coolant system 140, a fuel system 180, an ignition system 190 and a controller 170.

The genset 100 may be a back-up power source in the event of a loss of electrical grid power. In one embodiment, the genset 100 may be provided in recreational vehicles to subsidize grid electricity or as the primary power source when grid electricity is not being used or when grid electricity fails. In other embodiments, the genset 100 may be provided as a secondary source of power for homes or businesses. In yet another embodiment, the genset 100 may be the primary source of power where grid power is not readily available, such as remote locations or construction sites. The genset 100 can also be used as a primary power source for marine vessels, railway engines, construction equipment, or any other application where mechanical and/or electrical power is desired. The genset 100 may be included as a backup or short term operation reserve (STOR) power source for supplying power to a load or utility grid L within a predetermined time of receiving a power request by the utility grid or load L, for example within 75 seconds. The genset 100 can be configured to provide a target power corresponding to the power requested to the utility grid or load L within a predetermined cold start time (i.e., the time from cold startup to providing the target power), as described in detail herein.

The engine 102 can include an IC engine (e.g., a lean burn natural gas engine, a diesel engine, a dual fuel engine, etc.) which converts fuel (e.g., diesel, gasoline, ethanol, etc.) into mechanical energy. Combustion of fuel by the engine 102 produces an exhaust gas (e.g., a diesel exhaust gas) that can include NOx gases, carbon monoxide, and/or other harmful pollutants which should be reduced or otherwise treated before expelling into the environment.

The generator 104 can include a wound rotor or permanent magnet alternator configured to convert a rotational mechanical power produced by the engine 102 into electrical energy. In some embodiments, the generator 104 can be mechanically coupled to the engine 102 by a mechanical linkage that can provide a desired turn ratio, a torque converter, a transmission, any other form of rotary linking mechanism, or a combination thereof. In some embodiments, an inverter can also be electrically coupled to the generator 104.

The generator 104 is configured to produce an electrical output. The electrical output can include a voltage and/or a current, and is representative of a load on the engine 102. For example, the electrical output can correspond to the engine 102 power (e.g., power=voltage×current). In particular embodiments, the electrical output from the generator 108 can be converted or inverted to transform the electrical output from a direct current (DC) to an alternating current (AC).

The intake system 101 is located upstream of the engine 102 and is in connection with the engine 102. The intake system 103 is structured to receive air, as well as fuel from the fuel system 180 (e.g., from a fuel injector included in the fuel system 180) and communicate atomized fuel-air mixture to the engine 102. The flow rate of air in the intake system 101 and/or the amount of fuel provided by the fuel system 180 can determine the air/fuel ratio provided to the engine 102. In some embodiments, the intake system 101 can include an intercooler (not shown) configured to reduce a temperature of the intake air, for example to reduce auto-ignition or knocking, or an exhaust gas recirculation (EGR) system to introduce a portion of an exhaust gas produced by the engine 102 into the intake air provided to the engine 102 to cool combustion temperatures and reduce emissions.

The exhaust system 108 is structured to receive the exhaust gas (e.g., a natural gas exhaust gas or diesel exhaust gas) from the engine 102 and decompose constituents (e.g., NOx gases included in the exhaust gas). For example, the exhaust system 108 may include one or more catalysts formulated to reduce the pollutants included in the exhaust gas. The fuel system 180 is structured to insert fuel, for example natural gas or diesel, into the intake system 101 for delivery to the engine 102. In one embodiment, the fuel system 180 can include a fuel injector structured to insert fuel into the engine 102. In other embodiments, the fuel system 180 can include a carburetor. In still other embodiments, the fuel system 180 can include fuel mixers, valves, nozzles, any other components or combinations thereof to facilitate inserting of the fuel in the engine 102. The fuel injector included in the fuel system 180 can include an electromechanical valve that provides metering of the fuel into the engine 102. The fuel injector is normally closed and opens to insert pressurized fuel for a specified length of time into the intake system 101 or the engine 102. The fuel injector atomizes the fuel by forcibly pumping the fuel through a small nozzle under pressure. In one embodiment, the atomized fuel is mixed with intake air in the intake system 101 and ignited by a spark plug. In another embodiment, the atomized fuel is injected directly into the intake air in the combustion cylinders of the engine 102 and ignited by the heat of compression (in compression ignition engines, such as a diesel or HCCI) or are ignited by a spark from a spark plug (such as with gas direct injection or GDI).

The ignition system 190 is configured to control the ignition of the air fuel mixture included in the engine 102 based on a spark timing map. For example, the engine 102 can include a plurality of spark plugs to ignite the air/fuel mixture (e.g., an air/natural gas mixture) inserted into combustion chambers of the engine 102 and the ignition system 190 is configured to control the activation of the spark plugs. Alternatively, the ignition time can be configured to insert the air/fuel mixture (e.g., an air/diesel mixture) at a predetermined time during a compression cycle of the one or more combustion chambers of the engine 102 to cause auto-ignition of the air/fuel mixture.

Figure 16:
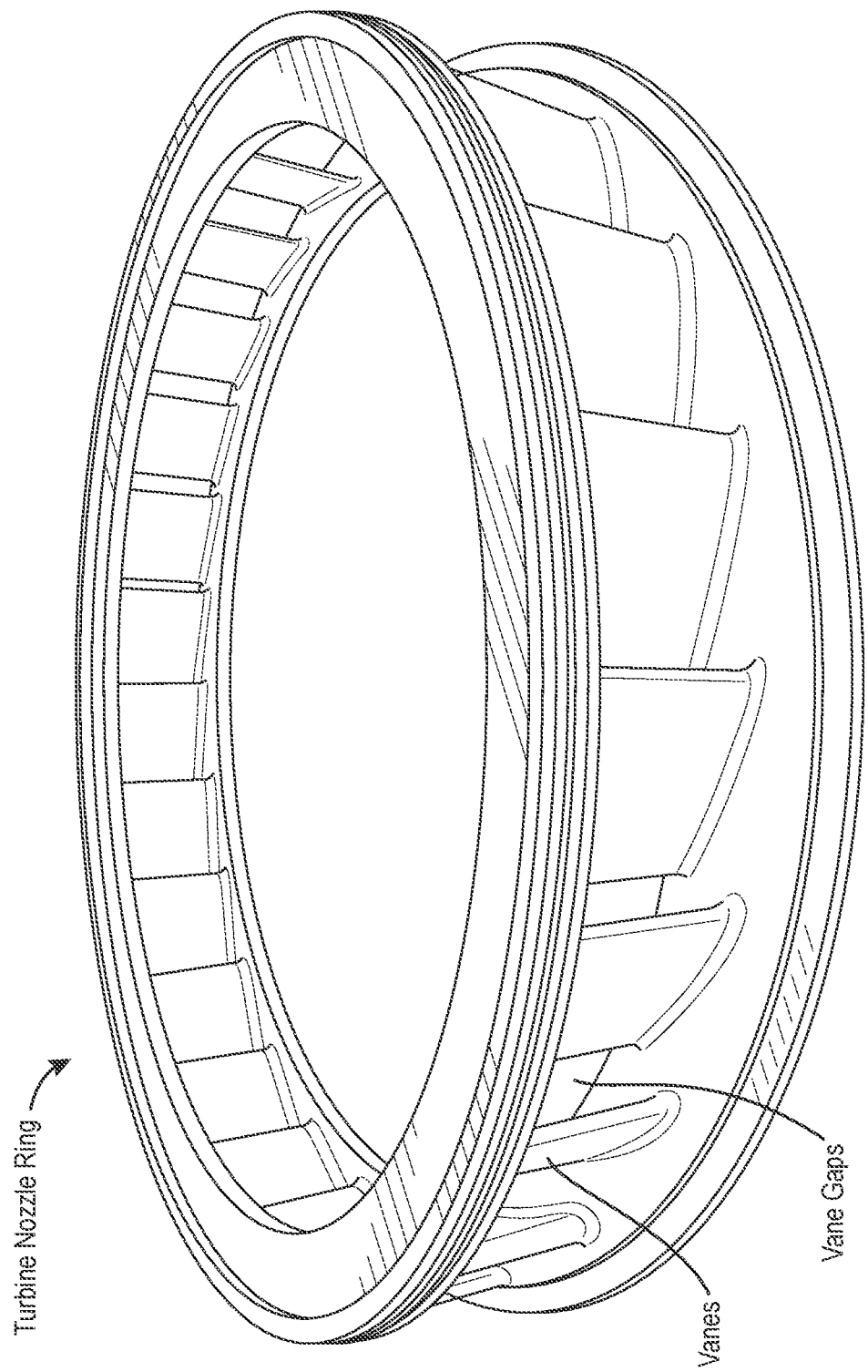
FIG. 16 is an image of an embodiment of a turbine nozzle ring that can be included in a turbocharger system included in the genset of FIG. 1.

In some embodiments, the genset 100 can also include a turbocharger system 106. In particular embodiments, the turbocharger system 106 includes a single turbocharger. The turbocharger system 106 can be located downstream of the engine 102 and upstream of the exhaust system 108. A turbocharger included in the turbocharger system 106 is structured to extract energy from the exhaust gas flowing through the turbocharger system 106 to generate a turbo power output that increases the intake air pressure (or in some cases, generates electrical or mechanical power directly, such as turbogenerator). The increased intake manifold air pressure from the turbo power output supplements or augments the volumetric efficiency and power produced by the engine 102 to allow the engine 102 to generate a target power at a higher efficiency. In various embodiments, the turbocharger includes a turbine nozzle ring (not shown) which controls the velocity and expansion of the exhaust gas as it flows through the turbine nozzle ring (e.g., the turbine nozzle ring shown in FIG. 16) towards the turbocharger to provide a predetermined pressure drop, as described in detail herein.

The lubricant system 110 is structured to store and provide lubricant (e.g., mineral oil, a synthetic oil or a combination thereof) to the engine 102 to lubricate the components of the engine 102. The lubricant system 110 can include a storage tank, pumps, conduits, lubricant filters or any other components structured to communicate the lubricant to the engine 102. A lubricant heating system 112 is fluidly coupled to the lubricant system 110 and configured to heat the lubricant, as described in detail herein. The lubricant heating system 112 is separate from the lubricant system 110 and can be structured to receive lubricant from one end of a lubricant reservoir or sump of the engine 102 and communicate lubricant heated to a predetermined lubricant temperature back to the sump.

The speed control system 120 is configured to control an acceleration of the speed of the engine 102 to ramp the speed of the engine 102 to a target speed. For example, the speed control system 120 can include a tachometer to sense an rpm speed of the engine 102 communicatively coupled to the fuel system 180 (e.g., via the controller 170) to adjust an air/fuel ratio or quantity inserted into the engine 102 to control the acceleration thereof. In various embodiment, the speed control system 120 is also configured to control a speed bias which, once constant speed is reached and the breaker is closed, represents a difference between a target power output corresponding to the power requested by the utility grid or load L, and a current or actual power output of the genset 100, as described herein.

The HT coolant system 130 includes an HT coolant circuit structured to circulate an HT coolant (e.g., water, ethylene glycol, polypropylene glycol any other suitable HT coolant or a combination thereof). The HT coolant system 130 includes a heater configured to preheat the HT coolant above a predetermined HT coolant temperature to maintain the HT coolant at the predetermined HT coolant temperature before genset 100 startup, to keep specific parts of the engine 102 at the predetermined HT coolant temperature. The LT coolant system 140 includes an LT coolant circuit separate from the HT coolant circuit circulating an LT coolant (e.g., water) and structured to cool the intake air provided to the engine 102, for example via the intercooler. The LT coolant circuit 140 facilitates a combustion process by reducing intake air temperatures when the engine 102 is at steady state temperatures. In various embodiments, the heater of the HT coolant system 130 is operatively coupled to the LT coolant system 140 to heat the LT coolant before startup, as described herein.

Other components which can be included in the genset 100 and are not shown in FIG. 1 include a fuel pump, a fuel pressure regulator, other various input sensors such as, for example, rotational speed sensor, a throttle position sensor, a crank position sensor, a cam position sensor, a coolant sensor, an oil temperature sensor, manifold air temperature and pressure sensors, exhaust gas temperature sensors, NOx sensors, knock sensors, oxygen sensors, particulate matter sensor, fuel quality/characteristic sensor, humidity sensor, any other components, or a combination thereof.

The controller 170 is configured to control at least a portion of the genset 100. The controller 170 is communicatively coupled with each of the generator 104, the circuit breaker 105, the lubricant system 110, the lubricant heating system 112, the speed control system 120, the HT coolant system 130, the LT coolant system 140, the fuel system 180 and the ignition system 190. In some embodiments, the controller 170 communicates with each of these components via separate communication circuitry, for example, electrical leads. In other embodiments, one type of communication circuitry may be used to communicate with multiple components (e.g., a single wireless communication interface may be used to communicate wirelessly with multiple components).

The controller 170 can include a processor (e.g., a microcontroller) and one or more sensors, for example an electrical sensor for sensing a signal produced by one or more components of the genset 100 described herein, for example a lubricant temperature, an engine speed, generator electrical parameters (e.g., generator voltage, frequency and/or phase), load electrical parameters (e.g., load voltage, frequency and/or phase), power requested by load, power produced by genset 100 etc. as described herein. In some embodiments, the controller 170 can be included in a control module which is in electrical communication with one or more of the components of the genset 100 described herein and operable to perform the sensing and control functions described herein. In particular embodiments, the controller 170 can be a system computer of the genset 100, for example included in the computer device 630 shown in FIG. 17. In some embodiments, the controller 170 and the communication circuitry form an open loop control system. In other embodiment, the controller 170 and the communication circuitry can form a closed loop control system.

Figure 2:
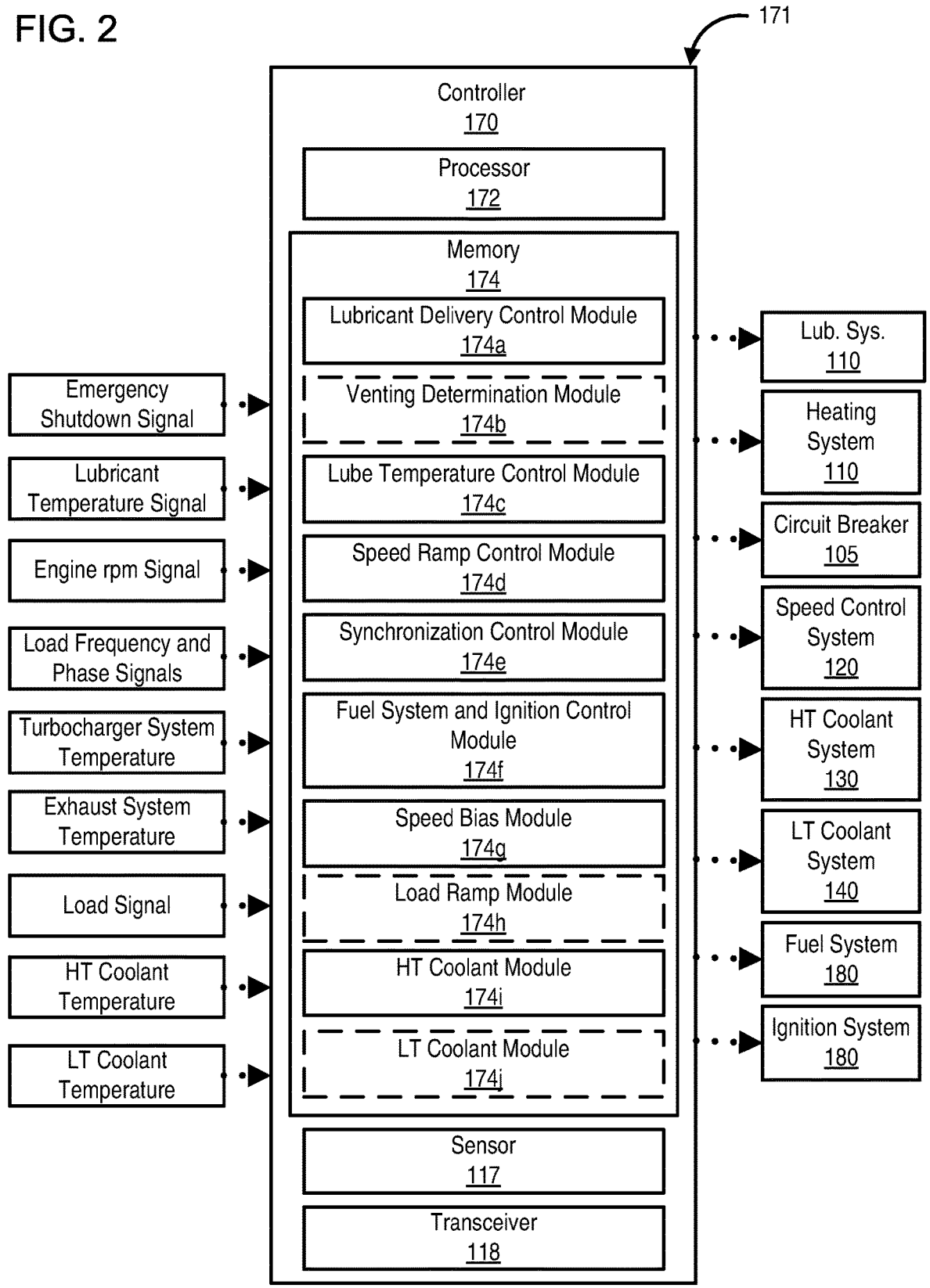
FIG. 2 is a schematic block diagram of a controller included in the genset of FIG. 1.

For example, FIG. 2 is a schematic block diagram of a control module 171 which includes the controller 170 and shows various components which can be included in the controller 170. The controller 170 includes a processor 172, a memory 174 or other computer readable medium, a sensor 176 and a transceiver 178. It should be understood that the controller 170 shows only one embodiment of the controller 170 and any other controller capable of performing the operations described herein can be used.

The sensor 176 can include an electrical sensor configured to receive and interpret an electrical output from one or more components of the genset 100. For example, as shown in FIG. 2 the sensor 176 can be configured to sense one or more of an emergency shutdown signal of the genset 100, a lubricant temperature signal from the lubricant system 110 (e.g., from a temperature sensor included in the lubricant heating system 110 and an engine rpm signal (e.g., from a tachometer) indicative of an engine speed. The sensor 176 can also be configured to sense signals corresponding to frequency and phase of the utility grid or load L and/or generator 104, a turbocharger system 106 temperature, an exhaust system 108 temperature, a load signal, for example corresponding to power requested by the utility grid or load L, a HT coolant temperature and a LT coolant temperature.

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. Memory 174 may also include one or more storage devices (e.g., hard drives, flash drives, computer readable media, etc.) either local or remote to device controller 114.

The memory 174 is configured to store look up tables, algorithms or instructions. For example, the memory 174 includes a lubricant control module 174a, a lubricant or lube temperature control module 174c, a speed ramp control module 174d, a synchronization control module 174e, a fuel system and ignition system control module 174f, a speed bias module 174g, a HT coolant module 174i, and optionally a venting determination module 174b, a load ramp module 174h and a LT coolant module 174j. Each of these modules is configured to provide instructions to a corresponding component of the genset 100 to perform sensing or actuation functions as described herein.

The transceiver 178 is configured to generate actuation and/or control signals in response to information received from at least one of the systems of the genset 100 described herein.

Figure 5:
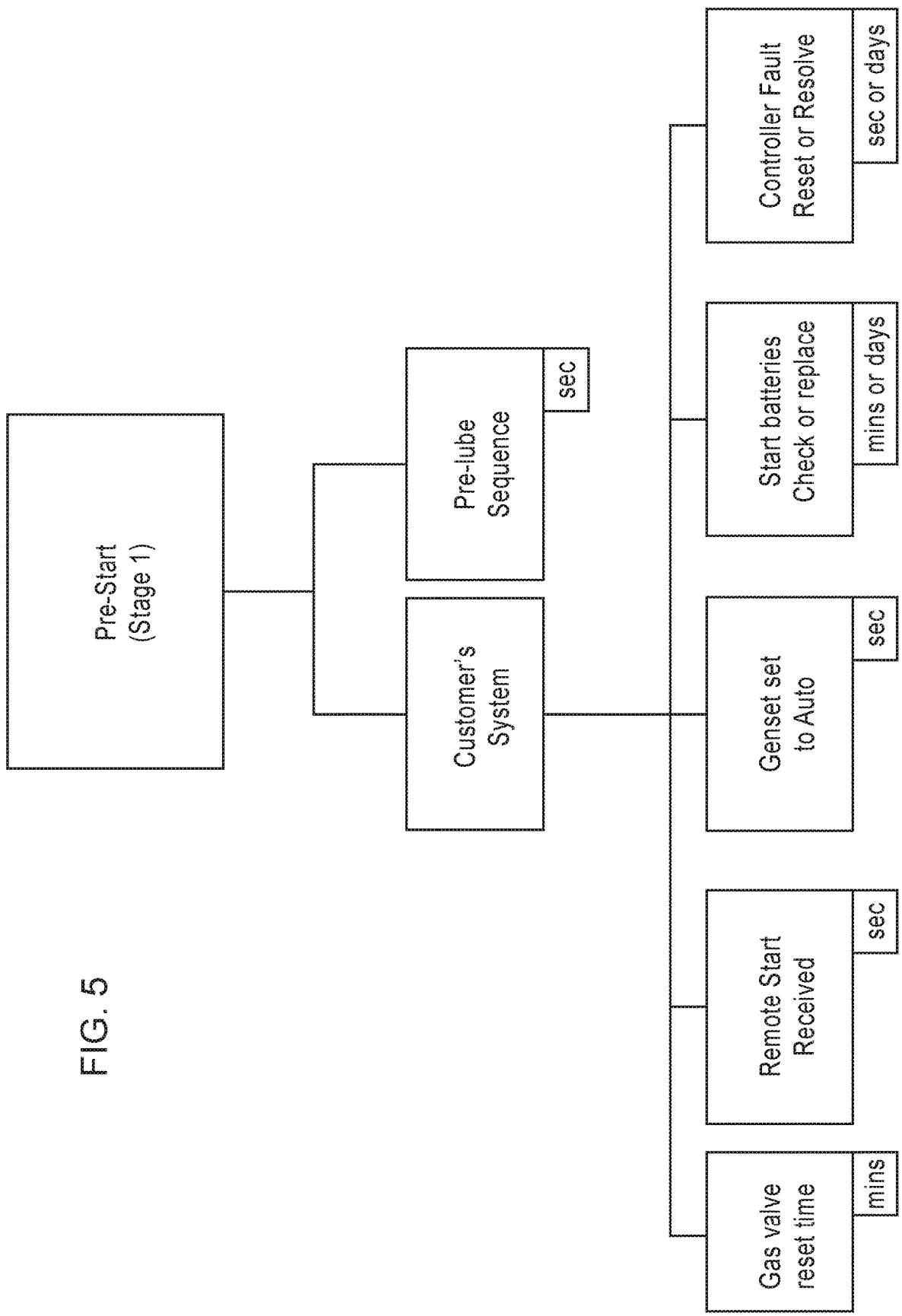
FIG. 5-8 are tree diagrams representing important parameters including protocols, subsystems and other parameters that influence the time taken by the genset from cold start to producing a target power which represents the power requested by a load, during a pre-start, speed ramp, synchronization and power ramp stages of the genset.

Expanding further, the genset 100 proceeds through various stages from startup leading to a fully operational state in which the genset 100 is providing a target power and/or turbocharger intake pressure boost corresponding to a power requested from the genset 100 to the utility grid or load L. FIGS. 5-8 are parameter tree diagrams highlighting the various parameters which influence a startup time, and more specifically a cold start time of the genset 100 which the genset 100 takes to reach the target power, as described herein. FIG. 5 shows the first stage (stage 1) which is a pre-start stage, i.e. before genset 100 startup. Various parameters can influence the cold start time of the genset 100, for example parameters defined by a customer system in which the genset 100 is deployed which can include, for example a gas valve reset time, a remote start received request (i.e., a startup request by the user), the genset 100 set to auto startup, condition of start batteries (e.g., do they need to be replaced) and whether controller fault is reset or resolve. Another parameter of the pre-start stage is a pre-lube sequence.

Generally, a lubricant system 110 of a genset (e.g., the lubricant system 110 of the genset 100), for example a single turbocharger genset, includes a "pre-start pre-lube sequence" which delays startup of the genset by an amount of time required to pre-lubricate the genset 100, for example the engine 102 of the genset 100, until the engine oil pressure meets and maintains a calibrated pressure threshold that indicates that the engine is sufficiently lubricated for startup. However, this takes a significant amount of pre-lubrication time to raise the oil pressure to a desired level, for example 30 seconds or more.

The controller 170, for example the lubricant delivery control module 174a included in the controller 170, includes circuitry configured to generate a lubricant control signal instructing the lubricant system 110 to provide lubricant to the genset 100, for example the engine 102 of the genset 100, at predetermined time intervals before the genset 100 startup. In some embodiments, the predetermined time interval is in the range of 5 minutes to 10 minutes or any other predetermined time interval, allowing maintaining the oil pressure level above threshold. This can substantially shorten the pre-lubrication time. For example, providing the lubricant at the predetermined time intervals sufficiently lubricates the engine 102 in less than 5 seconds.

In various embodiments, providing the lubricant to the engine 102 via the lubricant system 110 can possibly break one or more seals of a turbocharger included in the turbocharger system, for example leading to "coking". Coking refers to the solidification of lubricant residue due to the lubricant escaping from the seals of the turbocharger and being exposed to oxidation and/or thermal decomposition. In some embodiments, the lubricant control signal provided to the lubricant system 110 can also instruct the lubricant system 110 to provide the lubricant to the genset 100, for example the engine 102 and/or the turbocharger system 106 of the genset 100 after the genset 100 is stopped (post-lubrication) to prevent coking. For example, the post-lubrication can protect bearings of the turbocharger system 106 during stopping of the turbocharger included in the turbocharger system 106. In various embodiments, the lubricant pressure during pre-lubrication and post-lubrication can be maintained at a predetermined lubricant pressure, for example in the range of 0.5 bar to 1 bar (e.g., 0.5, 0.6, 0.7, 0.8, 0.9 or 1 bar inclusive of all ranges and values therebetween).

Generally, during normal shutdown of a genset, the genset is idled for a predetermined post idle time to purge a fuel system of the genset of any leftover air/fuel mixture from a previous running operation. In particular, this may be required with a gaseous fuel genset. This eliminates the need for venting during startup and ensures that that the air/fuel mixture is at anticipated levels and sparking does not lead to an overpressure or backfire developing in an intake system. However, during an emergency shutdown of the genset, the post idle purging does not occurs. In such scenarios, the vent cycle occurs for a predetermined venting time at the genset startup, for example for about 8-10 seconds.

In some embodiments, the controller 170, for example the venting determination module 174b included in the controller 170 is configured to receive an emergency shutdown signal indicating that an emergency shutdown of the genset 100 has occurred. In such embodiments, the controller 170, for example the venting determination module 174b can generate a venting signal, for example e.g. a fault code or an alarm communicated to a user and instructing the user to vent the fuel system 180 before a subsequent power request by the utility grid or load L. Thus, the vent cycle is not performed when the power request by the utility grid or load is received thereby saving the predetermined venting time.

Figure 6:
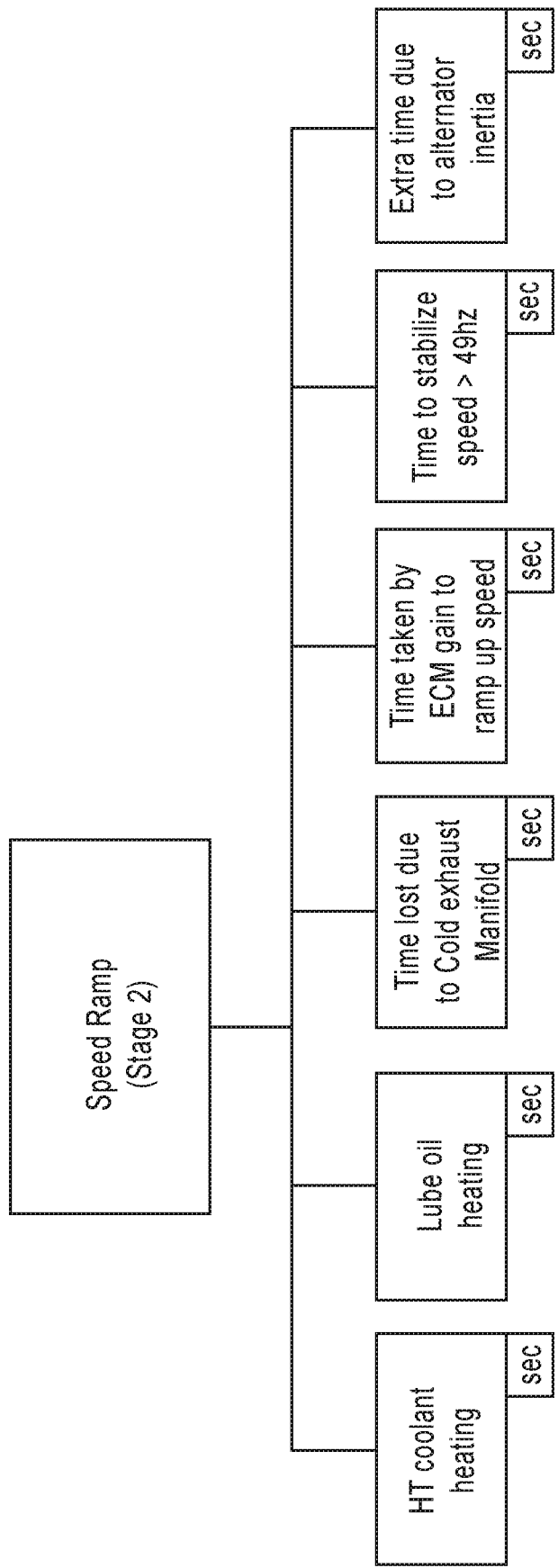

FIG. 6 shows the second stage (stage 2) of the genset 100 after startup which is speed ramp or acceleration stage in which the engine 102 is accelerated to a predetermined speed, for example a final operational speed of about 1,500 rpm. Various parameters which govern the time it takes for the genset 100 to reach full operational speed include a lubricant temperature, a HT coolant temperature, the time lost due to cold exhaust system 108 (or cold exhaust manifold), the time to stabilize speed and the time it takes to overcome generator 104 or alternator inertia.

Generally, gensets are configured on cold startup to idle (e.g., at 900 rpm) for a predetermined idling time to allow the lubricant to reach a predetermined lubricant temperature, for example equal to or greater than 40 degrees Celsius. The lubricant is allowed to run through the engine 102 and other components of the genset 100 for the predetermined idling time to reach the predetermined lubricant temperature. The predetermined idling time can be significant, for example equal to or greater than 5 minutes. Once the lubricant is at the predetermined lubricant temperature, the engine 102 accelerates to the final operational speed of the engine, for example 1,500 rpm.

The lubricant heating system 112 is fluidly coupled to the lubricant system 110 and configured to heat the lubricant to the predetermined lubricant temperature. For example controller 170 (e.g., the lubricant temperature control module 174c included in the controller 170) can be configured to receive a lubricant temperature signal, for example from a temperature sensor included in the lubricant system 110. If a lubricant temperature is less than the predetermined lubricant temperature, which is generally the case during cold startup, the controller 170, for example the lubricant temperature control module 174c, is configured to generate a lubricant heating signal instructing the lubricant heating system 112 to heat the lubricant to the predetermined lubricant temperature (e.g., greater than 40, 45 or 50 degrees Celsius) before the genset 100 startup. Pre-heating of the lubricant, therefore, allows the lubricant to be at the predetermined lubricant temperature before startup and/or during the acceleration phase. This allows exclusion of the predetermined idling time, thereby significantly reducing the cold start time. In some embodiments, the heating of the lubricant to the predetermined lubricant temperature (e.g., greater than 50 degrees Celsius) is achieved within a lubricant heating time of equal to or less than 15 seconds. It is to be noted that the predetermined idling time is also configured to allow the exhaust system 108 to be heated to a predetermined exhaust temperature (e.g., equal to or greater than 400 degrees Celsius), for example to provide exhaust gas at a sufficient temperature to the turbocharger system 106. Exclusion of idling, therefore does not allow the exhaust system 108 to be heated to the predetermined exhaust temperature and the exhaust gas is below the predetermined exhaust temperature.

Generally, HT cooling systems included in the gensets include heaters configured to heat the HT coolant (e.g., to about 50 degrees Celsius, in some implementations) before startup, to prevent various components of the engine and/or the turbocharger from getting too cold. However, when the genset is fully operational, the HT coolant temperature raises to and is maintained at a predetermined HT coolant temperature greater than 50 degrees Celsius, for example above 80 degrees Celsius. Thus, considerable amount of time and energy is lost during startup, and more specifically cold startup to allow raising of the temperature to the predetermined HT coolant temperature.

The controller 170 of the genset 100, for example the HT coolant module 174i included in the controller 170, is configured to generate a HT coolant system control signal instructing the HT coolant system 130 (e.g., the heater included in the HT coolant) to heat the HT coolant of the genset 100 to greater than a predetermined HT coolant temperature (e.g., 80 degrees Celsius) before the genset 100 startup. For example, the controller 170 can be configured to receive a HT coolant temperature signal from the HT coolant system 130 (e.g., from a temperature sensor included in the HT coolant system 130) indicative of the temperature of the HT coolant. If the HT coolant temperature is below the predetermined HT coolant temperature, the controller 170 instructs the HT coolant system 130 to heat the HT coolant to the predetermined HT coolant temperature. In this manner, the HT coolant is already above the predetermined HT coolant temperature before genset 100 startup, thereby saving significant time and energy during the acceleration phase.

In some embodiments, the controller 170, for example the LT coolant module 174j included in the controller 170 can be configured to generate a LT coolant system control signal instructing the LT coolant system 140 to heat the LT coolant to a predetermined LT coolant temperature before genset 100 startup. Generally, the LT coolant included in LT coolant systems of gensets is not heated and is around ambient temperature before genset startup. The LT coolant temperature increases to a predetermined LT coolant temperature, for example about 50 degrees Celsius by the time the genset is running at a steady state. Thus, a significant amount of time and energy is wasted after startup, and particularly cold startup for the LT coolant to reach the predetermined LT coolant temperature. In contrast, the genset 100 heats the LT coolant to the predetermined LT coolant temperature before startup, thus saving significant time and energy for the genset 100 to reach target speed. In various embodiments, the heater included in the HT coolant system 130 is also used to the heat the LT coolant. In other embodiments, the LT coolant system 140 can be provided with a dedicated heater to preheat the LT coolant to the predetermined LT coolant temperature prior to the genset 100 startup. As described before, the LT coolant is structured to cool the intake air provided to the engine 102, for example via the intercooler. Heating the LT coolant reduces the level of cooling of intake air which, during startup, reduces how cold the exhaust is, thereby increasing the thermal and kinetic energy available in the exhaust through the turbocharger system 106.

The controller 170, for example the speed ramp control module 174d included in the controller 170, is also configured to generate a speed control signal instructing the speed control system 120 to ramp the speed of the genset 100 (i.e., the speed of the engine 102 of the genset 100) to a target speed continuously without pausing at a speed lower than the target speed. As described before, generally gensets include an idling time at a lower speed (e.g., 900 rpm)

relative to the target speed (e.g., 1,500 rpm). The genset 100 pre-heats the lubricant as described herein and the idling time is not required. The controller 170 can therefore accelerate the engine 102 to the target speed (e.g., 1,500 rpm) without pausing at a lower speed. In various embodiments, the controller 170, for example the speed ramp control module 174*d* can be communicatively coupled to a tachometer or engine rpm meter to receive continuous feedback on the rpm of the engine for facilitating control of the acceleration of an engine speed to the target speed.

In some implementations, the speed control signal instructs the speed control system 120 to monotonically ramp the speed of the genset 100 to the target speed. In some embodiments, the speed can be ramped to the target speed with very short intermediate pauses, for example spanning a time duration which is a below a predetermined pause time threshold (e.g., less than 1 seconds), and such activity may still be considered continuous ramping of the speed. Such small pauses may have negligible impact on the overall time to ramp the speed of the genset 100 to the target speed. In some embodiments, the ramp of the speed can include pausing below a speed threshold before ramping to the target speed. For example, the engine 102 can have an initial speed at startup (e.g., about 150 rpm) before the air/fuel mixture is actually inserted into the engine 102 via the intake manifold (e.g., an initial ignition speed due to battery causing the crankshaft of the engine 102 to rotate). Ramping of the engine speed from above this speed threshold to the target speed is then performed continuously or monotonically.

Figure 7:
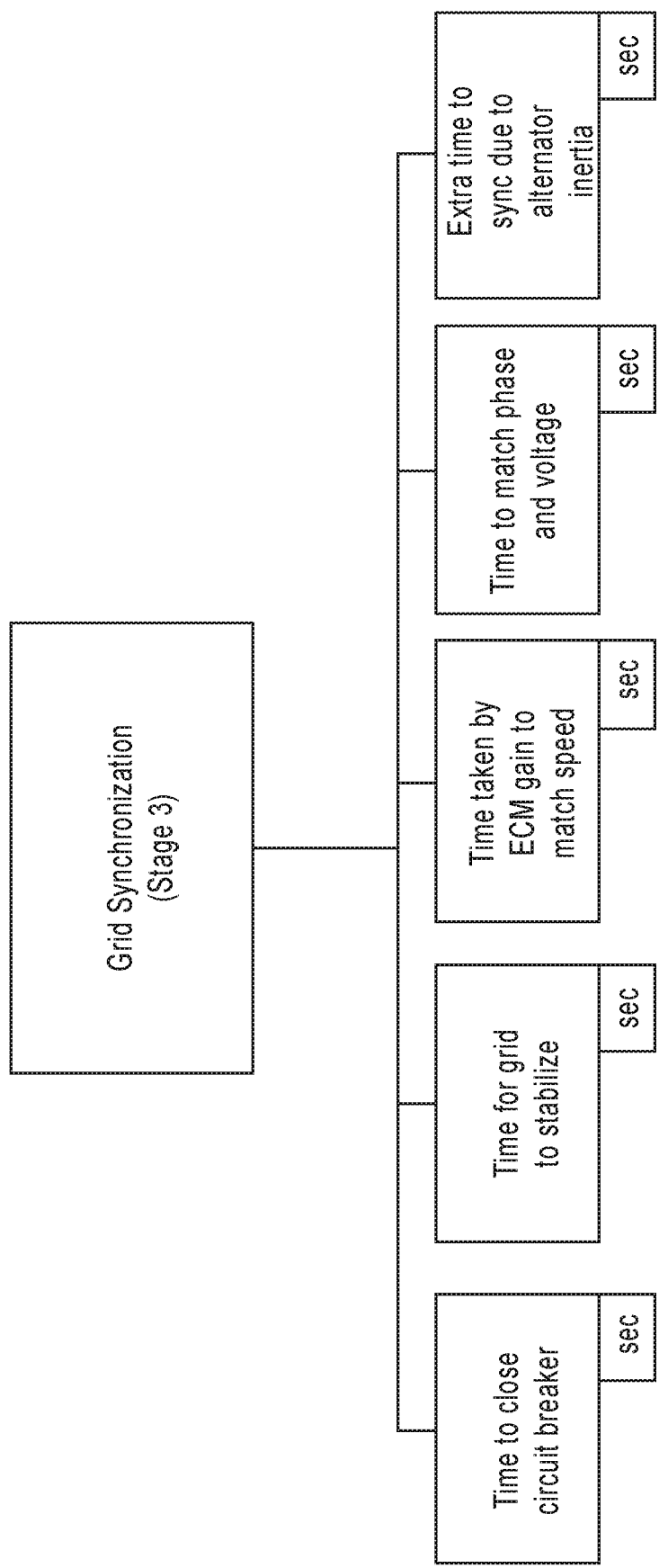

FIG. 7 shows a third stage (stage 3) during genset 100 startup which includes a synchronization stage (or grid synchronization stage if the genset is providing power to a grid). The synchronization stage includes synchronizing or matching of one or more genset electrical parameters (e.g., a voltage, frequency and/or phase of the electrical power produced by the generator 104 of the genset 100) to one or more utility grid or load electrical parameters (e.g., a voltage, frequency and/or phase that the load or utility grid L is configured to operate at), and closing of the circuit breaker 105 to electrically couple the generator 104 to the utility grid or load L. Other parameters that are involved include time for the grid to stabilize, time taken by an electronic control module (ECM), for example the controller 170 gain to match speed of the engine 102, and time taken to overcome generator 104 or alternator inertia but may not be as significant as the time for synchronizing and closing the circuit breaker 105.

The controller 170, for example the synchronization control module 174*e* is configured to generate a synchronizing signal instructing the generator 104 to synchronize the genset electrical parameters of the genset 100 to the load electrical parameters. Furthermore, the controller 170, for example the synchronization control module 174*e* included in the controller 170 is configured to generate a circuit breaker signal instructing the circuit breaker 105 to close to electrically couple the generator 104 to the utility grid or load L. The synchronizing and the electrical coupling is performed within a predetermined synchronization time, for example less than 10 seconds. Expanding further, the controller 170 can be configured to receive utility grid or load frequency and phase signals from the utility grid or load L. The synchronizing signal and the circuit breaker control signal generated by the controller 170 is configured to aggressively synchronize and close, for example by using aggressive synchronizing gains, reducing a synchronizing phase window to a safe region (e.g., 7 degrees) and reducing the phase matching dwell time to a very short time frame (e.g., 0.1 seconds or 0.5 seconds), and circuit breaker 105 is closed as soon as the matching window passes, i.e., the genset electrical parameters are matched with the utility grid or load L electrical parameters to prevent unsafe synchronization (or asynchronous operation) of the generator 104 and to achieve the predetermined synchronization time. In other words, the synchronizing and closing both occur in shorter times so that the synchronization is performed within the predetermined synchronization time. In some embodiments, the predetermined synchronization time can be equal to or less than 10 seconds.

Figure 8:
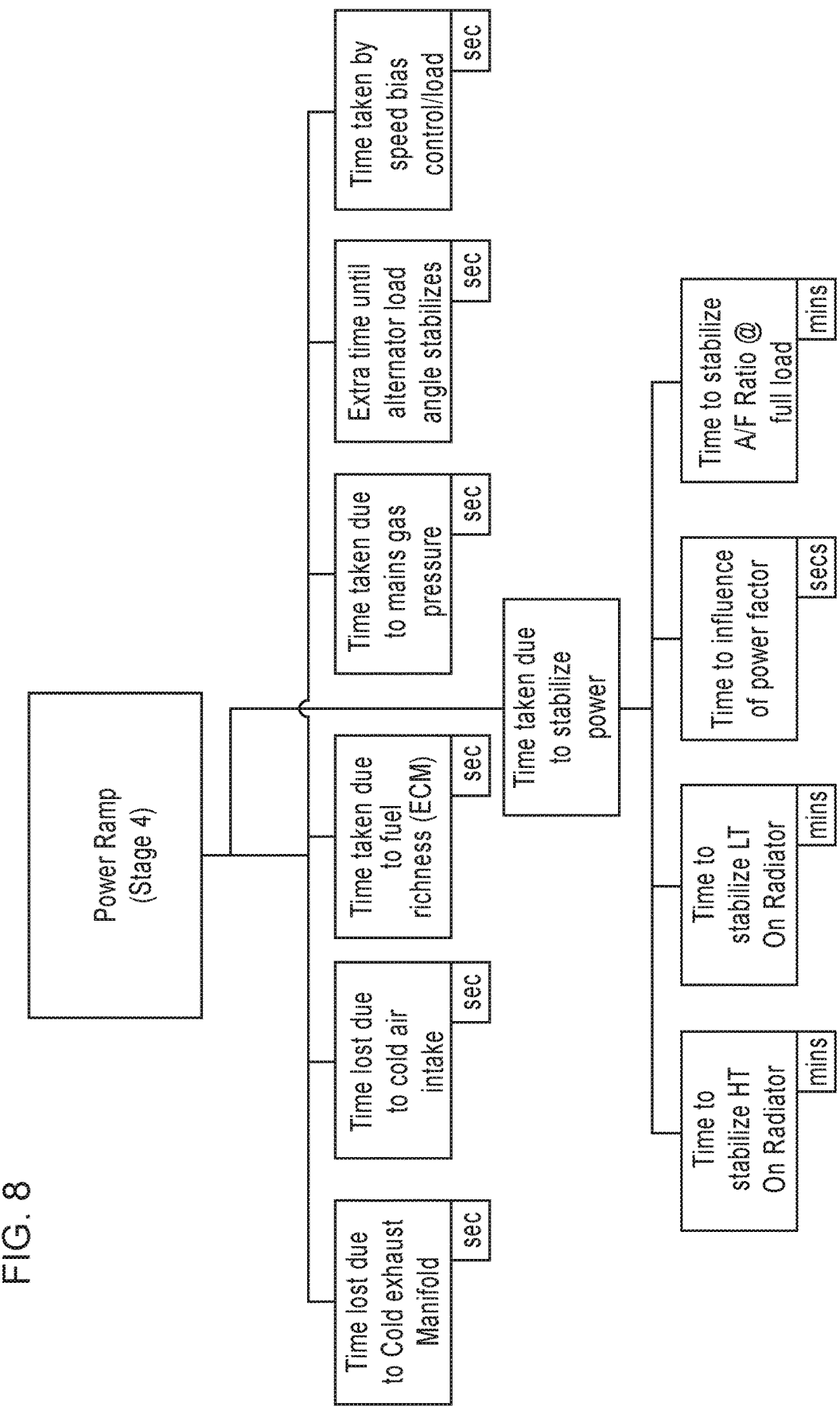

FIG. 8 shows a fourth and final stage (stage 4) of the genset 100 which includes a power ramp up of the genset 100 to a target power corresponding to a power requested of the genset 100. Various parameters that can influence a power ramp up time taken by the genset 100 to produce the target power are shown in FIG. 8. Among these, time lost due to cold exhaust manifold (e.g., due to exclusion of the idle time), time taken due to cold air intake, time taken due to fuel richness, time taken by a speed bias to match the speed of the engine 102 to the requested power as described herein, time to stabilize HT temperature and time to stabilize LT temperature, increase significantly during cold start of the genset 100.

As described before, the HT coolant and, optionally, the LT coolant are preheated before engine startup, which significantly reduces time and energy for the HT coolant to reach the predetermined HT coolant temperature, and the LT coolant to reach the predetermined LT coolant temperature. The controller 170, for example the fuel system and ignition system control module 174*f*, is configured to generate a fuel system control signal instructing the fuel system 180 to adjust a fueling rate based on a power being produced by the genset 100. For example, the fueling rate is increased to provide a richer air/fuel ratio to the engine 102. Moreover, controller 170, for example the fuel system and ignition system control module 174*f* is configured to generate an ignition system control signal instructing the ignition system 190 to adjust a spark timing based on the power being produced by the genset 100. For example, the adjusting of the spark timing can include slowing or retarding the spark timing.

Adjusting the fueling rate and the spark timing as described herein can allow reduction of a turbo lag of the turbocharger system 106. For example, the turbocharger system 106 can include a single turbocharger (e.g., a turbine) and throttle structured to selectively provide an increased flow rate and temperature of exhaust gas to the turbocharger for operating the turbocharger, such as by, but not limited to, providing a rich air/fuel mixture or retarded ignition spark. The turbo lag is defined as the time between the throttle opening and a corresponding increase in power or intake manifold pressure provided by the turbocharger. In other words, the turbo lag represents a time delay between activating the turbocharger and the turbo charger producing a desired turbo power output.

In various embodiments, an upper threshold of an oxygen sensor included in the exhaust system is adjusted to accommodate the higher NOx emissions produced due to the higher fueling rate during startup. The oxygen sensor provides an oxygen value used to correct a NOx value determined by a NOx sensor included in the exhaust system. Adjusting the upper threshold of the oxygen sensor allows the exhaust system to allow higher concentrations of the NOx to pass through which might be caused by the increased fueling rate and spark timing retardation. Moreover, a speed bias upper limit of a speed bias described in further detail below, may be increased to be in the range of +6% to +10%.

The controller 170, for example the speed bias module 174g included in the controller 170, is configured to generate a speed bias signal instructing the speed control system 120 to control a speed bias value in response to a power being produced by the genset 100. The speed bias value represents and/or is based on a difference between a target power output and a current power out of the genset 100 in response to the power being produced by the genset 100. In some embodiments, adjusting the fueling rate and spark timing and controlling the speed bias in response to the power being produced by the genset 100 causes a power ramp up time of the genset 100 to be equal to or less than 45 seconds. The speed bias signal is a throttle input provided to throttle of the engine 102 to increase or decrease a power output of the engine 102. The speed bias value is stored on a non-transitory computer readable medium (e.g., the memory 174 of the controller 170) and communicated to the throttle via non-transitory signal.

Expanding further, the speed bias value is generally set between −10% to +2% and allows requesting of more or less power from an engine and/or the rate at which the power should increase or decrease to reach a target power output corresponding to the power requested of the genset 100 (e.g., by the utility grid or the load L). Generally, when coupled to the utility grid, the speed bias value is controlled based on time set by a user to ramp up the genset 100 output to the target power, which is sufficient for slow startup applications or when the engine is warm, but may not be suitable for quick cold startup applications.

In some embodiments, specifically utility grid parallel applications, the controller 170 controls the speed bias value in response to power being produced by the genset 100 during at least some conditions. It is to be appreciated that controlling the speed biasvalue in response to power being produced by the genset 100, for example corresponding to a power target of the utility grid or load L can be used in any genset (e.g., a single turbocharger genset, a multi turbocharger genset or any other genset) exclusively or in combination with any of the systems, methods or otherwise strategies described herein to reduce a cold startup time of the engine 102.

In various embodiments, the genset 100 includes at least the engine 102, the generator 104 including the circuit breaker 105 electrically coupleable to the utility grid or load L, and the speed control system 120. The controller 170 is configured to determine if the generator 104 is electrically coupled to the utility grid or load L, for example via the circuit breaker 105. In response to determining the generator 104 is electrically coupled to the utility grid or load L, the controller 170 (e.g., the speed bias module 174g) generates a speed bias value controlled in response to the power being produced by the genset 100. The controller 170 then controls the power of the engine 102 using the speed bias value. The controller 170 can set the speed bias upper limit to be in the range of +6% to +10%.

Figure 12:
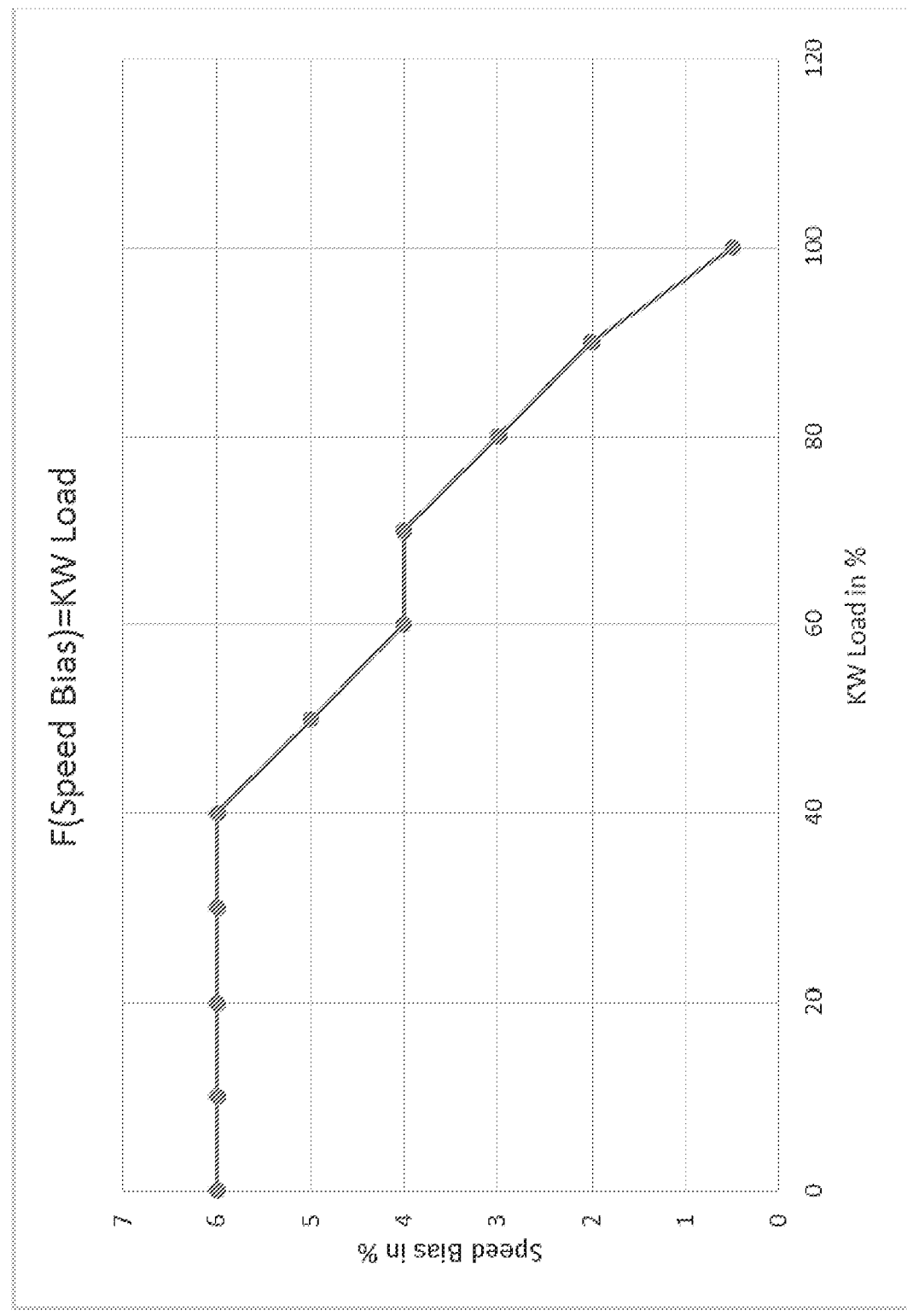
FIG. 12 is a plot of a speed bias value vs load representing control of a speed bias value for ramping a genset speed in response to power being produced by the genset.

In some embodiments, controlling the speed bias includes initiating the speed bias value at or near a speed bias upper limit, for example in the range of +6% to +10%. For example, FIG. 12 is an example plot of speed bias vs power requested by load. As shown in FIG. 12, the speed bias is initiated at a speed bias upper limit, which is +6% in the example plot of FIG. 12. Furthermore, the controller 170 can be configured to reduce the speed bias value from the speed bias upper limit in response to a power provided by the genset 100 approaching a power requested by the load L which prevents the power provided by the genset 100 from exceeding the power requested by the load L. For example, as shown in FIG. 12, the speed bias reduces from +6% to +5% once the power provided by the genset 100 is 50% of the power requested of the genset (e.g., by the utility grid or load), and continues to decrease to less than 1%, once the power provided by the genset 100 is close to 100% of the power target of the genset 100.

Controlling the speed bias value in response to the power being produced by the genset 100 on cold startup provides the shortest load ramp or power ramp time by starting at the speed bias upper limit, while maintaining stability by inhibiting the power provided by the genset 100 to exceed the power requested of the genset 100. In various embodiments, the turbocharger system 106 of the genset 100 includes a single turbocharger and a throttle structured to selectively provide exhaust gas to the turbocharger for operating the turbocharger. In such embodiments, the controller 170 can also be configured to fully control torque demand (i.e., speed bias level) at various levels of power requested of the genset 100, and hence, the controller 170 is capable of avoiding increasing torque when the time between the throttle opening and a corresponding increase in power provided by the turbocharger (i.e., the turbo lag) is long in duration and exceeds a predetermined time threshold (e.g., 70 seconds). In response to turbo lag, the controller 170 may maintain the speed bias value within the speed bias upper limit, thereby preventing the power provided by the genset 100 from exceeding the power requested of the genset 100 after the turbo lag ends. In contrast, controlling the value of the speed bias signal based on time, particularly during cold start, may push for more torque when turbo lag is experienced, which can lead an engine control module of a genset to trip or shutdown and "fault" due to the apparent unresponsiveness of the power provided by the genset to surging speed bias.

In some embodiments, the controller 170 is further configured to determine if an exhaust system temperature of the exhaust system 108 is below a predetermined temperature threshold. In response to determining that the exhaust system temperature is below the predetermined temperature threshold and the generator 104 is electrically coupled to the utility grid or load L (i.e., the circuit breaker 105 is closed), the controller 170 may control the speed bias value in response to the power being produced by the genset 100. The predetermined temperature threshold can be 400 degrees Celsius.

Expanding further, the predetermined temperature threshold represents the temperature above which the exhaust gas is sufficiently hot and thereby has sufficient thermal and kinetic energy to cause the turbocharger to produce maximum turbo power output, thereby reducing turbo lag to insignificant levels or levels that do not affect the predetermined power ramp up target time. However, during cold startup the temperature of the exhaust gas is below the predetermined threshold (e.g., less than 400 degrees Celsius) so that the turbocharger is unable to produce the maximum turbo power output. As described herein, controlling the speed bias value as a function of the power being provided by the genset 100 allows the speed bias to be capped at the speed bias upper limit, thereby allowing the engine 102 to ramp to a target power corresponding to the power being produced by the genset 100 even though the exhaust system temperature is below the predetermined temperature threshold.

The predetermined temperature threshold can be used to switch control of the speed bias value in response to the power being produced by the genset 100 or based on time.

For example, in response to determining that the exhaust system temperature is above the predetermined temperature threshold, the controller 170 controls the speed bias based on time. Above the predetermined temperature threshold, controlling the speed bias value based on time can be sufficiently suitable to ramp the power produced by the engine 102 to the target power.

Furthermore, the controller 170 can also be configured to determine whether the power provided by the genset is equal to a target power (i.e., 100% of the power requested of the genset 100). In response to determining the power provided by the genset 100 is equal to the target power, the controller 170 generates a second speed bias signal configured to cause the speed control system 120 to control the speed bias value based time, as described herein. In other words, the speed bias can be controlled in response to theof power being produced by the genset 100 during cold startup to provide short load or power ramp time and once the power provided by the genset 100 reaches the target power and/or an exhaust system temperature exceeds the predetermined temperature threshold, the speed bias is controlled based on time.

In various embodiments, the speed bias value is controlled based on time set by the user for load ramps but the load ramp gains and/or load ramp time target is/are adjusted based on the load level. For example, the controller 170, for example the load ramp module 174*h* included in the controller 170, can receive a load signal corresponding to a power requested of the genset 100 and adjust a time for ramping the engine power to the target power corresponding to the power requested of the genset 100. The resulting speed bias plot is similar in response to FIG. 12, however, the controller 170 achieves the speed bias response indirectly via changing the load ramp gains and/or load ramp. When the power provided by the genset is zero, the speed bias response time is set to zero and/or the load PID (proportional integral and differential) gains are set to very aggressive values to obtain an immediate speed bias response. The speed bias response time is maintained at zero and/or the load PID gains are maintained at very aggressive values until the power provided by the genset 100 reaches almost 100% of target power (e.g., 75% or 80%). The speed bias response time is then automatically adjusted to 5 seconds and/or the PID gains are automatically adjusted to be less aggressive. While the adjusted time based control of the speed bias is easier to stably implement, it may be difficult to maintain the speed bias value within the speed bias upper limit using time based control which may push for more torque when turbo lag is experienced, which can lead an engine control module of a genset to trip or shutdown due to the apparent unresponsiveness of the power provided by the genset to surging speed bias.

In some embodiments, a total time from cold starting the genset to providing the power requested of the genset 100 thereto is less than a predetermined cold start time. In particular embodiments, the cold start time is 75 seconds.

In some embodiments, the turbocharger system 106 (e.g., a single turbocharger system) includes a turbine nozzle ring structured to provide a pressure drop thereacross which is sufficient to cause the turbocharger system 106 to produce a target power output within a load ramp time of less than 40 seconds. The turbine nozzle ring is structured to expand the exhaust gas inserted into the turbocharger system 106 and direct the exhaust gas towards the turbocharger to provide kinetic energy for rotating the turbocharger. The gaps between vanes of the turbine nozzle ring may be decreased to increase the pressure drop thereacross, and improve the performance of the turbocharger so that turbocharger system 106 produces a target power output within a load ramp time of less than 40 seconds. In various embodiments, the turbocharger system 106 includes a model TA60 turbine nozzle ring available from ABB shown in FIG. 16.

In some implementations, a pressure of an intake manifold which can be included in the intake system 101 may also be ramped continuously or monotonically. Furthermore, a turbocharger flow which represents a flow of an exhaust gas through the turbocharger (e.g., a single turbocharger included in the turbocharger system 106) may also be ramped or increased continuously or monotonically. This can correspond to a smooth turbocharger power output communicated to the engine 102, which facilitate the ramping of the engine speed continuously or monotonically to the target speed, as described. Furthermore, this can also allow increase of turbo power output on cold start.

In various embodiments, the controller 170 can be configured to determine if the genset 100 is cold on startup (e.g., an engine 102 or an exhaust system temperature is below a predetermined temperature threshold as described herein) and operate the genset 100 using any combination of the systems and methods described herein if this condition is met. On the contrary, if the cold startup conditions are not met (i.e., the genset is warm), the genset 100 may be started using any other systems or methods, for example any commonly used systems or methods for starting gensets (e.g., single turbocharger gensets).

Figure 3:
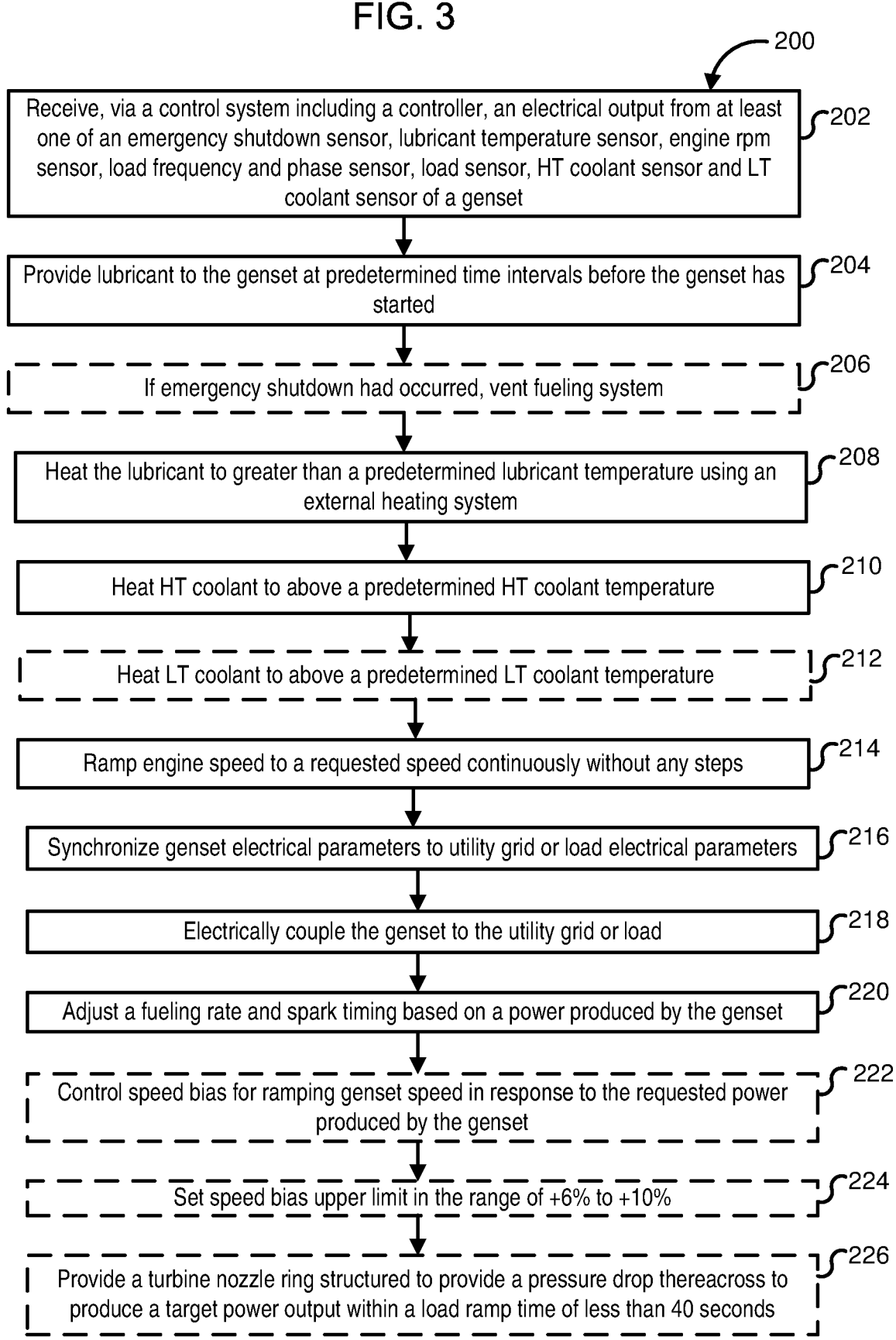
FIG. 3 is a schematic flow diagram of an embodiment of a method for reducing a cold start time of a genset.

FIG. 3 shows a block diagram of an exemplary method 200 for reducing cold startup time of a genset for providing a requested power to a utility grid or load, for example the load L. The method 200 can be used with any genset, for example, the genset 100 (e.g., a single turbocharger genset) or any other type of genset. The instructions for the method 200 can be stored on a CRM, for example the memory 174 of the controller 170. The method 200 includes receiving, via a control system including a controller, an electrical output from at least one of an emergency shutdown sensor, lubricant temperature sensor, engine rpm sensor, load frequency and phase sensor, load sensor, HT coolant sensor and LT coolant sensor of a genset at 202. For example, the controller 170 is configured to receive each of these signals as described herein. Furthermore, the method 200 can be selectively used to operate the genset, for example the genset 100 during cold startup conditions, and the genset can be operated using any other method including the method 200 if cold startup conditions are not met.

A lubricant may be provided to the genset at predetermined time intervals before a genset startup at 204. In some embodiments, the predetermined time interval for providing lubricant to the genset is in the range of 5 minutes to 10 minutes. Moreover, the providing the lubricant at the predetermined time intervals can sufficiently lubricate the engine in less than 5 seconds. For example, the controller 170 generates a lubricant control signal instructing lubricant system 110 to provide the lubricant to the engine 102 of the genset 100 at the predetermined time intervals, for example in the range of 5 minutes to 10 minutes, to pre-lubricate the engine 102, so that the engine 102 of the genset 100 is sufficiently lubricated in less than 5 seconds.

In some embodiments, the method 200 includes determining if an emergency shutdown of the genset has occurred, and in response to determining the emergency shutdown has occurred, the fueling system is vented at 206. For example, the controller 170 can detect an emergency shutdown of the genset 100 has occurred and communicate a signal, for example an alarm or a fault code to a user to vent the fueling system 180.

The lubricant may be heated to a predetermined lubricant temperature using an external heating system before the genset startup at 208. For example, the controller 170 generates a lubricant heating signal instructing the lubricant heating system 112 to heat the lubricant provided to the genset 100 by the lubricant system 110 to the predetermined lubricant temperature (e.g., equal to or greater than 50 degrees Celsius). In various embodiments, heating of the lubricant to the predetermined lubricant temperature is achieved within a lubricant heating time of equal to or less than 15 seconds.

A HT coolant of the genset may be heated to greater than a predetermined HT coolant temperature before the genset startup at 210. For example, the controller 170 generates an HT coolant system control signal instructing the HT coolant system 130 to heat the HT coolant to greater than the predetermined HT coolant temperature (e.g., greater than 80 degrees Celsius) before genset 100 startup.

In various embodiments, an LT coolant of the genset is also heated to a predetermined LT coolant temperature before genset startup at 212. For example, the controller 170 generates an LT coolant system control signal instructing the LT coolant system 140 to heat the LT coolant to the predetermined LT coolant temperature (e.g., equal to or greater than 50 degrees Celsius).

The engine speed may be ramped to a target speed continuously without pausing at a speed lower than the target speed at 214. For example, the controller 170 generates a speed control signal instructing the speed control system 120 to ramp the speed of the genset 100 (i.e., the engine 102 of the genset 100) to a target speed (e.g., 1,500 rpm) without pausing at a speed lower than the target speed. In some implementations, the method 200 can include monotonically ramping the speed of the genset to the target speed. In some embodiments, the speed can be ramped to the target speed with very short intermediate pauses, for example spanning a time duration which is a below a predetermined pause time threshold (e.g., less than 1 seconds).

Genset electrical parameters of the genset may be synchronized to the utility grid or load electrical parameters of the utility grid or load at 216. For example, the controller 170 generates a synchronizing signal instructing the generator 104 to synchronize the genset electrical parameters (e.g., a genset voltage, frequency and phase) to the utility grid or load electrical parameters (e.g., a utility grid or load voltage, frequency and phase). The genset is electrically coupled to the utility grid or load at 218. For example, the controller 170 generates a circuit breaker signal instructing the circuit breaker 105 to close to electrically couple the generator 104 to the utility grid or load L. The synchronizing and the electrical coupling is performed within a predetermined synchronization time. In some embodiments, the predetermined synchronization time is equal to or less than 10 seconds.

A fuel rate and spark timing may be adjusted based on a power being produced by the genset at 220. For example, the controller 170 generates a fuel system control signal instructing the fuel system 180 to adjust the fueling rate based on the power being produced by the genset 100, for example increase the fueling rate as described herein. Furthermore, the controller 170 also generates an ignition system control signal instructing the ignition system 190 to adjust spark timing based on the power being produced by the genset 100, for example retard or slow the spark timing as described herein.

In some embodiments, the method 200 includes controlling a speed bias value representing a difference between a target power output and a current power output of the genset in response to the power being produced by the genset at 222. For example, the controller 170 is configured to generate a speed bias control signal instructing the speed control system 120 to control the speed bias value in response to the power being produced by the genset 100. In some embodiments, the method 200 includes setting a speed bias upper limit to be in the range of +6% to +10%. In some embodiments, the genset (e.g., the genset 100) includes a turbocharger system (e.g., the turbocharger system 106) which includes a single turbocharger and a throttle structured to selectively provide exhaust gas to the turbocharger for operating the turbocharger. In such embodiments, the method 200 can also include maintaining the speed bias within a speed bias upper limit in response to a time duration between the throttle opening and a corresponding increase in power provided by the turbocharger (i.e., a turbo lag) exceeding a predetermined time threshold (e.g., 70 seconds).

Adjusting the fueling rate and spark timing and controlling the speed bias as a function of the power requested by the load can cause a power ramp time of the genset to be equal to or less 45 seconds. Moreover, cold starting a genset, for example the genset 100 (e.g., a single turbocharger genset) using the method 200 can provide a total time for cold starting the genset to provide the power requested of the genset 100 which is less than a predetermined cold start time (e.g., 75 seconds).

In some embodiments in which the genset includes a turbocharger system (e.g., the turbocharger system 106), the method 200 can also include providing a turbine nozzle ring structured to provide a pressure drop thereacross at 226. The pressure drop is sufficient to cause the turbocharger system to produce a target power output within a load ramp time of less than 40 seconds. The turbine nozzle ring can include the models with smaller vanes (e.g., the TA60 turbine nozzle ring shown in FIG. 16), as described herein. In some embodiments, the method 200 can also include continuously or monotonically increasing a turbo flow of the turbocharger, (e.g., the turbocharger included in the turbocharger system 106). In various embodiments, systems and methods described herein can cause an increase in a turbo output power on cold start of the genset.

While 206, 212 and 222-226 are described above as separate optional embodiments, it should be understood that one or more of 206, 212 and 222-226 may be performed in combination with one another in various exemplary embodiments. Further, while various operations of method 200 are described as optional, it should be appreciated that, in various embodiments, any combination of operations can be utilized and/or any operations may be omitted, regardless of whether the operations are expressly stated to be optional in the description above.

Figure 4:
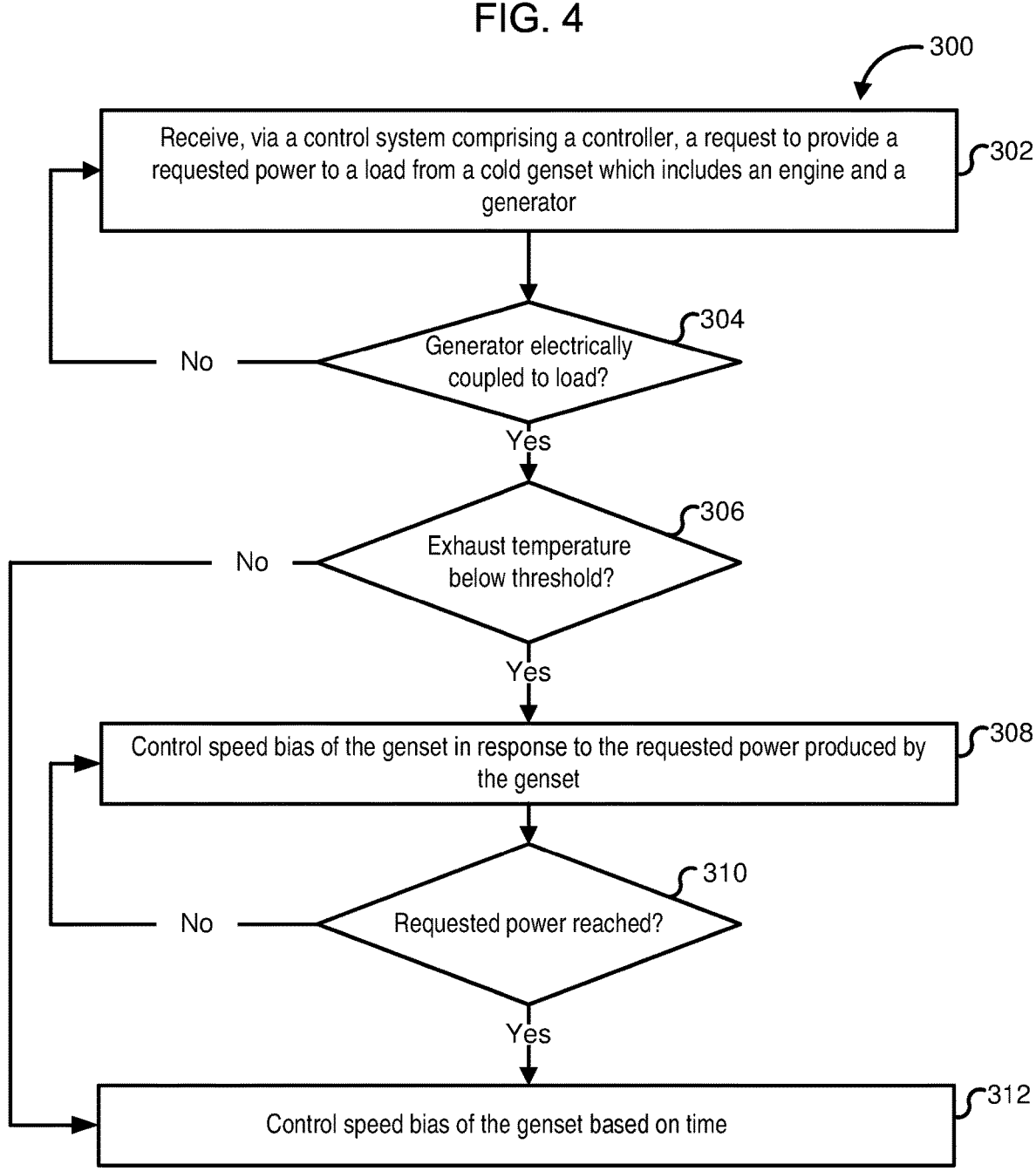
FIG. 4 is a schematic flow diagram of another embodiment of a method for reducing cold start time of a genset and producing a target power by controlling a speed bias value in response to the power being produced by the genset.

FIG. 4 is a schematic flow diagram of another example method 300 for reducing a cold start time of a genset, for example a genset 100 by controlling the speed bias as a function of power being produced by the genset, for example the utility grid or load L. The method 300 can be used to operate any suitable genset, for example a single turbocharger genset, a multi turbocharger genset or any other genset. The method 300 can be used exclusively to reduce a cold start time of a genset or in combination with any other methods, for example the method 200 described herein. Furthermore, the method 300 can be selectively used to operate the genset, for example the genset 100 during cold startup conditions, and the genset can be operated using any other method including the method 300 if cold startup conditions are not met.

The method 300 includes receiving, via a control system including a controller, a request to provide a power requested to the utility grid or load from a cold genset which includes an engine and a generator at 302. For example, the controller 170 of the genset 100 receives a request from the user to provide a power requested by the utility grid or the load L. It is determined if the generator is electrically coupled to a utility grid or load at 304. For example, the controller 170 determines if the circuit breaker 105 of the generator 104 is closed which indicates that the generator 104 is electrically coupled to the utility grid or load L. If the generator is not electrically coupled to the utility grid or load, the method 300 returns to operation 302 until the generator is coupled to the utility grid or load.

In some embodiments in which the genset also includes an exhaust system, the method 300 can also include determining if an exhaust system temperature of the exhaust system is below a predetermined threshold at 306. In response to determining the generator is electrically coupled to the utility grid or load, and/or the exhaust system temperature is below the predetermined temperature threshold, a speed bias value, which represents a difference between a target power output and a current power output of the genset, is controlled in response to the power being produced by the genset at 308. The power of the engine is controlled using the speed bias value. However, if operation 306 is false, the method 300 proceeds to operation 312 and the speed bias value is controlled based on time.

For example, the controller 170 may generate a speed bias signal instructing the speed control system 120 of the genset 100 to control the speed bias value in response to power being produced by the genset 100, as described herein. In various embodiments, a speed bias upper limit is set to be in a range of +6% to +10%. Controlling the speed bias can include initiating the speed bias value at a speed bias upper limit. The predetermined temperature threshold represents a temperature below which the exhaust gas may not have sufficient kinetic energy to prevent turbo lag, for example a temperature of 400 degrees Celsius. In some embodiments, in response to determining that the exhaust system temperature is above the predetermined temperature threshold, the speed bias value is controlled based on time at 312. For example, if the controller 170 determines that the exhaust system temperature is above the predetermined temperature (e.g., above 400 degrees Celsius), the controller 170 generates a second speed bias signal instructing the speed control system 120 to control the speed bias value based on time, as described herein.

The speed bias can be reduced from the speed bias upper limit responsive to a power provided by the genset, for example the genset 100, approaching a power requested by the user which prevents the power provided by the genset from exceeding the power requested by the user. For example, as shown in FIG. 12, the speed bias value is initiated at a speed bias upper limit of +6% and is reduced to less than +1% as the power provided by the genset is close to 100% of the power requested of the genset 100.

In various embodiments in which the genset includes a single turbocharger and a throttle structured to selectively provide exhaust gas to the turbocharger, the method 300 can further include maintaining the speed bias within the bias upper limit if a time between the throttle opening and corresponding increase in power provided by the turbocharger (i.e., the turbo lag) exceeds a predetermined time threshold (e.g., 70 seconds). As described before, maintaining the speed bias value within the speed bias upper limit (e.g., a range of +6% to +10%) prevents the controller (e.g., controller 170) pushing for more torque when turbo lag is experienced, which in turn prevents the engine control module of a genset from tripping or shutdown due to the apparent unresponsiveness of the power provided by the genset to surging speed bias.

It is determined if the power provided by the genset is equal to a power requested by the load at 310. If operation 310 is false, the method returns to operation 308 and the speed bias value (e.g., generated by the controller 170) is continued to be controlled in response to power being produced by the genset. In response to determining that the power provided by the genset is equal to the target power, the speed bias value is controlled based on time at 312. For example, the controller 170 can determine that the power generated by the genset 100 is equal to the power requested by the user, and generate the second speed bias signal so that the speed bias value is controlled based on time.

Experimental Examples

FIGS. 9-11 and 13-15 are experimental plots of startup times of a single turbocharger genset from cold start up and reductions in cold startup time achieved using the various methods and strategies described herein. These examples are merely illustrations intended to facilitate understanding of the concepts described herein and are not intended to limit the disclosure in any shape or form.

Figure 9:
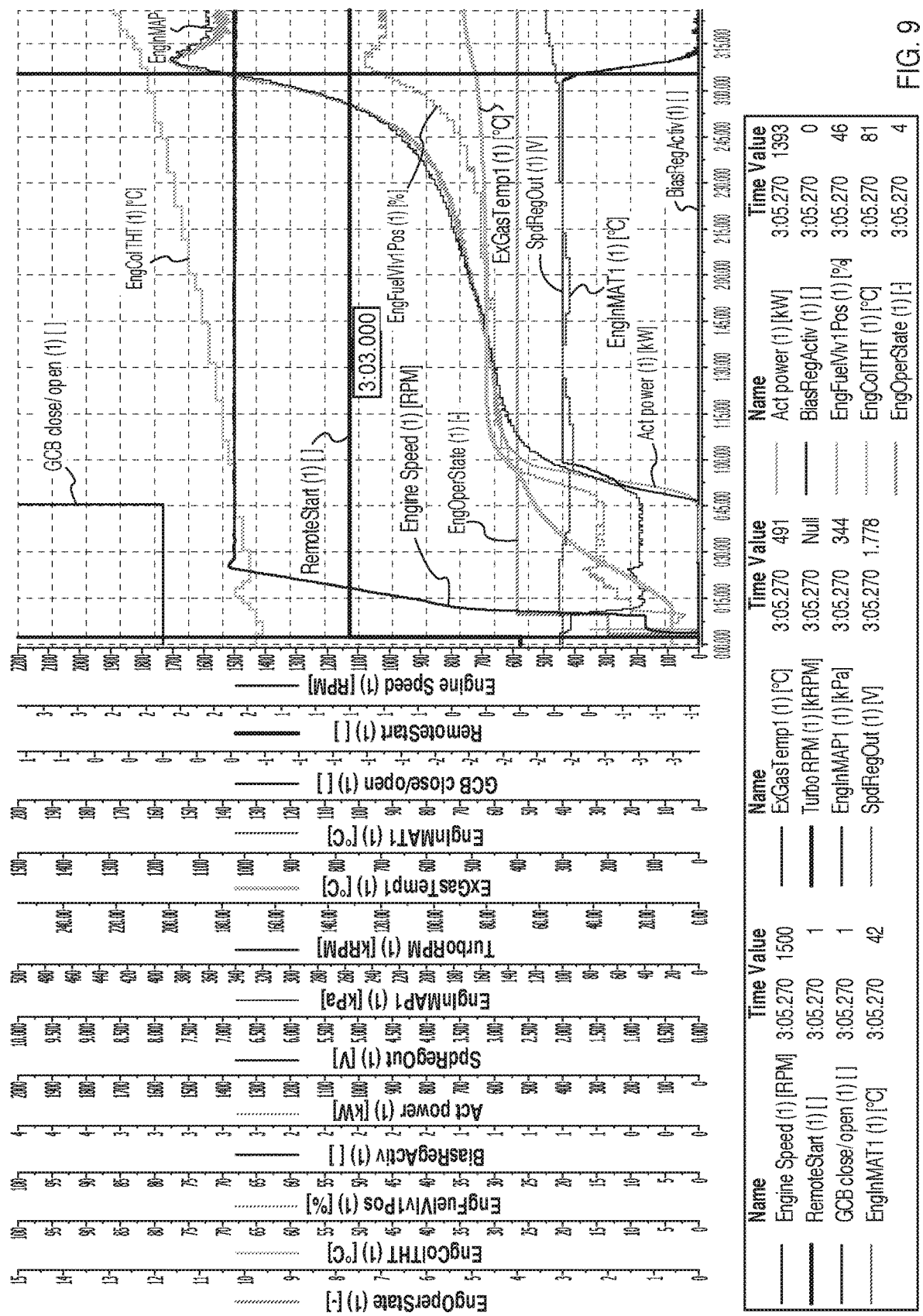
FIG. 9 is a plot of baseline startup performance of single turbocharger genset in which a lubricant was provided at predetermined intervals of 5 seconds before startup, the lubricant was heated during the speed ramp stage to a temperature greater than 50 degrees Celsius and a high temperature coolant was heated to a temperature above 80 degrees Celsius so that the cold start time of the genset was 183 seconds.

FIG. 9 is a plot of a baseline cold startup performance of single turbocharger genset (Cummins GQSK60 gas Hi Surf engine, Stamford PE7 F core generator, 1400 kW, 400 Volts, 3 phase genset) in which the lubricant is heated to greater than 50 degrees Celsius before genset startup, the lubricant is provided to the engine of the genset at predetermined intervals of 5 minutes before startup, and a HT coolant of the genset is heated to a temperature of greater than 80 degrees Celsius before genset startup and the engine speed is continuously or monotonically ranked to 1,500 rpm. A small pause can be seen in the engine speed at 150 rpm, which appears a plateau in FIG. 9 which corresponds to the engine speed where transition occurs from starter cranking before the fuel is actually inserted into the engine of the genset to engine operation. Once fuel is inserted, the engine speed is continuously or monotonically ramped to the target speed. The cold startup time was 183 seconds. Excluding each of these strategies from the cold startup protocol increases the cold startup time to greater than 630 seconds.

Figures 10A, 10B:
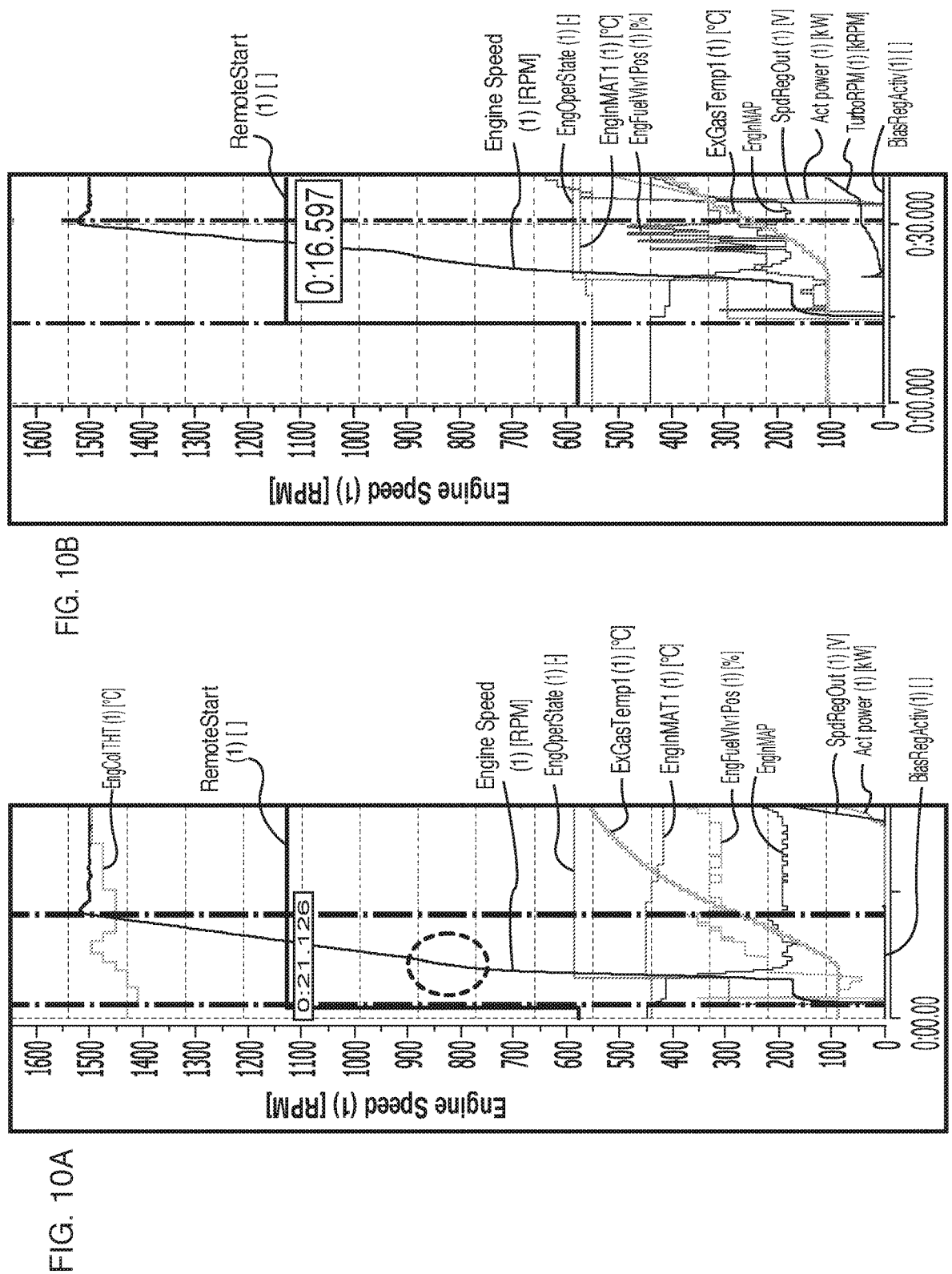
FIG. 10A is a plot of acceleration vs time of an engine of a single turbocharger genset which includes a speed acceleration in which the engine is idled at 900 rpm for a period of time before ramping to full speed of 1,500 rpm.
FIG. 10B is another plot of acceleration vs time of the genset of FIG. 10A in which the engine speed is continuously ramped to the full speed of 1,500 rpm.
Figures 11A, 11B:
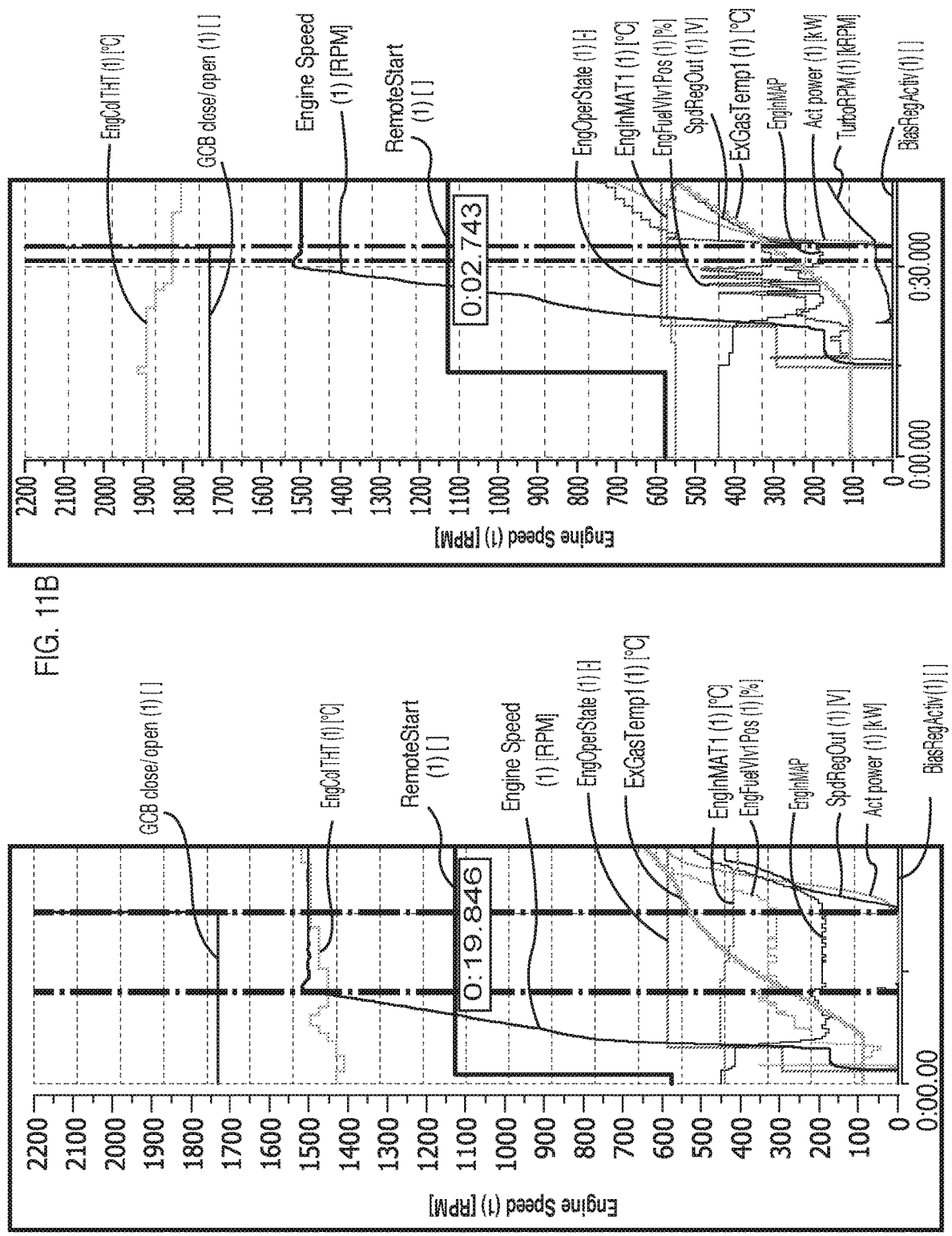
FIG. 11A is a plot of engine speed vs time showing a synchronization time used to synchronize and close a generator of a genset to a load using a conventional synchronization strategy (19.8 seconds)
FIG. 11B is a plot of engine speed vs time showing the synchronization and closing time achieved using a smaller synchronization time window and closing faster to achieve a significantly smaller synchronization time of 2.74 seconds.

FIG. 10A is a plot of a baseline acceleration of the single turbocharger genset during the speed ramp stage (stage 2 with reference to FIG. 6) in which the system accelerates first to a speed of 900 rpm, pauses briefly and then accelerates to a target engine speed of 1,500 rpm. In contrast, FIG. 10B is a plot of acceleration performed using the systems and methods described herein (e.g., the methods of FIG. 3) in which the engine is accelerated continuously to the operational engine speed of 1,500 rpm without pausing at a speed lower than the target engine speed. With continuous acceleration, the target engine speed was achieved in about 16 seconds saving about 5 seconds from the cold startup. As described before, the pause at 150 rpm is before the fuel is actually inserted into the engine. FIG. 11A is a plot of a time during a baseline synchronization time of the single turbocharger genset during a grid synchronization stage (stage 3 in FIG. 7) in which the synchronization and electrical coupling of the genset to the utility grid or load is performed using a generally used baseline window and electrical coupling. The synchronization time is about 20 seconds. In contrast, FIG. 11B is a plot of synchronization and electrical coupling performed using the systems and methods described herein (e.g., the methods of FIG. 3) so that the synchronization time was about 17 seconds significantly shorter than the baseline synchronization time.

Figure 13B:
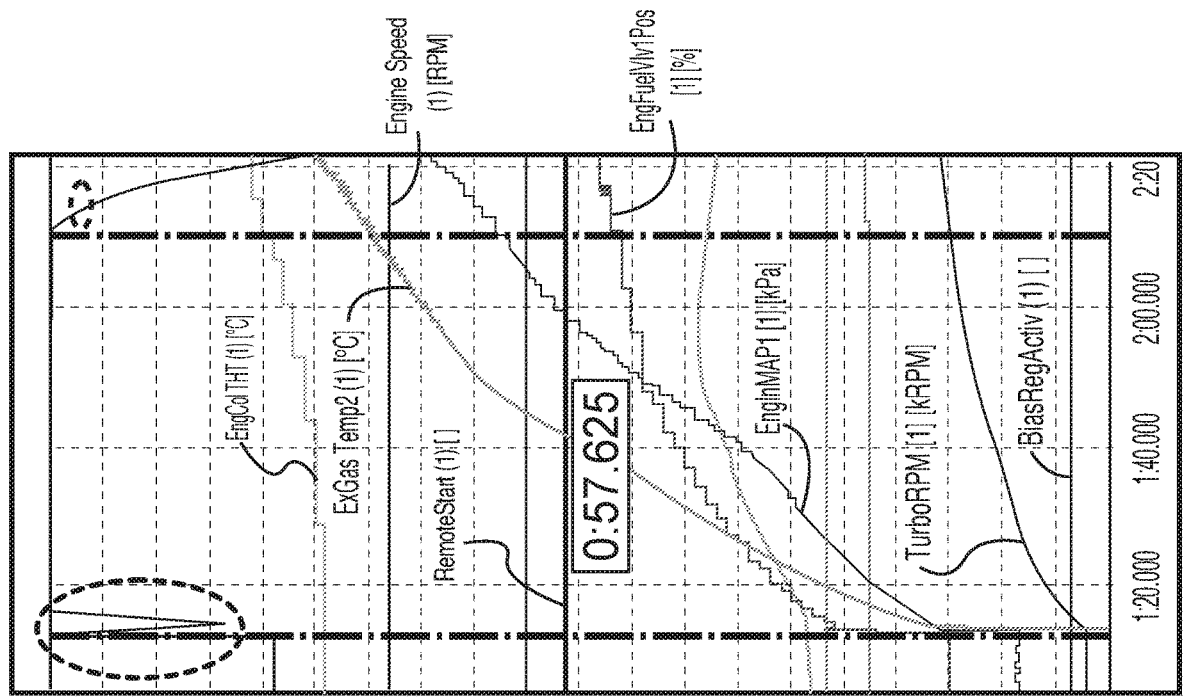
FIG. 13A-B are plots of genset power vs time.
Figure 13A:
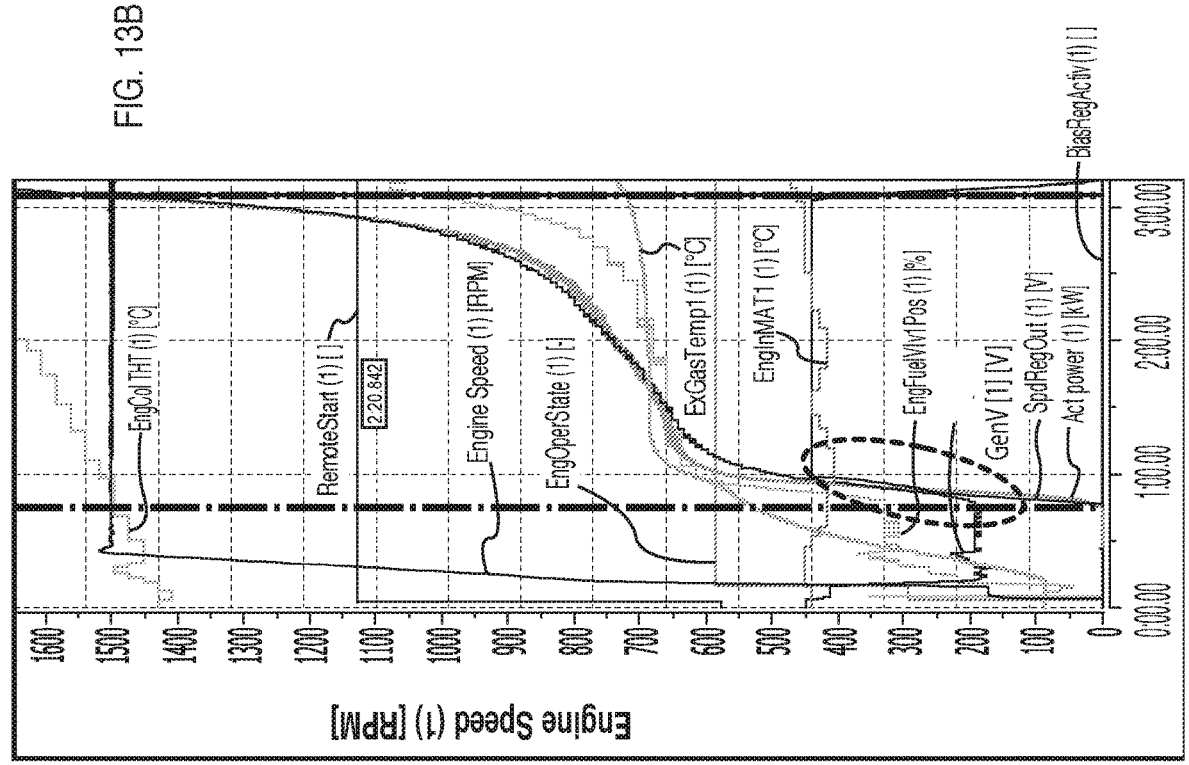

FIG. 13A is a plot of genset power vs time during a power ramp up stage (stage 4 in FIG. 8) in which the value of the speed bias signal is controlled as a function of time and the spark timing and fueling rate are unmodified, which takes about 2 minutes 21 seconds to increase the power of the engine to produce a target power corresponding to a power requested of the genset. FIG. 13B is a plot of genset power vs time in which the value of the speed bias signal is controlled as a function of power being produced by the genset and the spark timing and fueling rate are modified, as described herein. This allows the engine speed to reach the target power in about 58 seconds.

Figure 14:
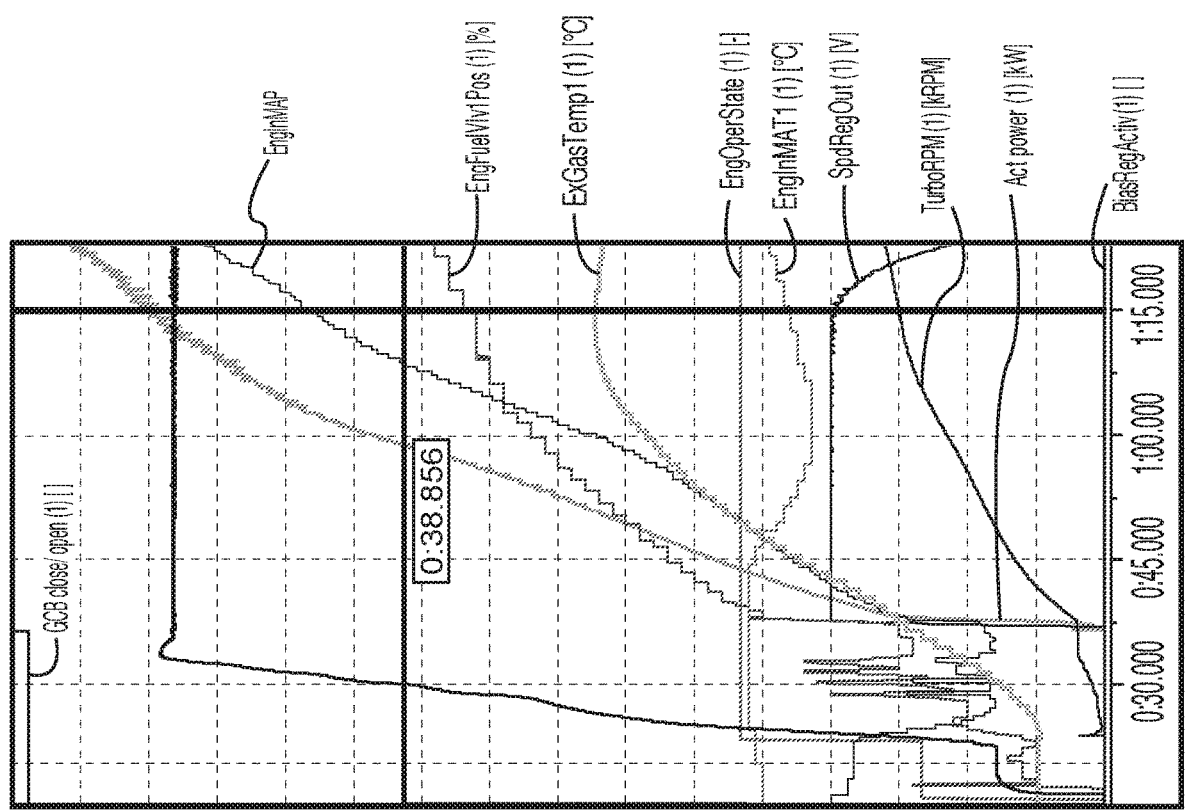
FIG. 14 is a plot of genset power vs time showing the time taken to provide a turbo power output using a turbocharger including turbine nozzle ring which is structured to provide a predetermined pressure drop thereacross such that a load ramp time for the turbocharger to reach the target power output is less than 40 seconds.

FIG. 14 is a plot of the time taken by the turbocharger of the single turbocharger genset which includes an ABB TA60 turbine nozzle ring, as described herein. The load ramp time was about 40 seconds.

Figure 15:
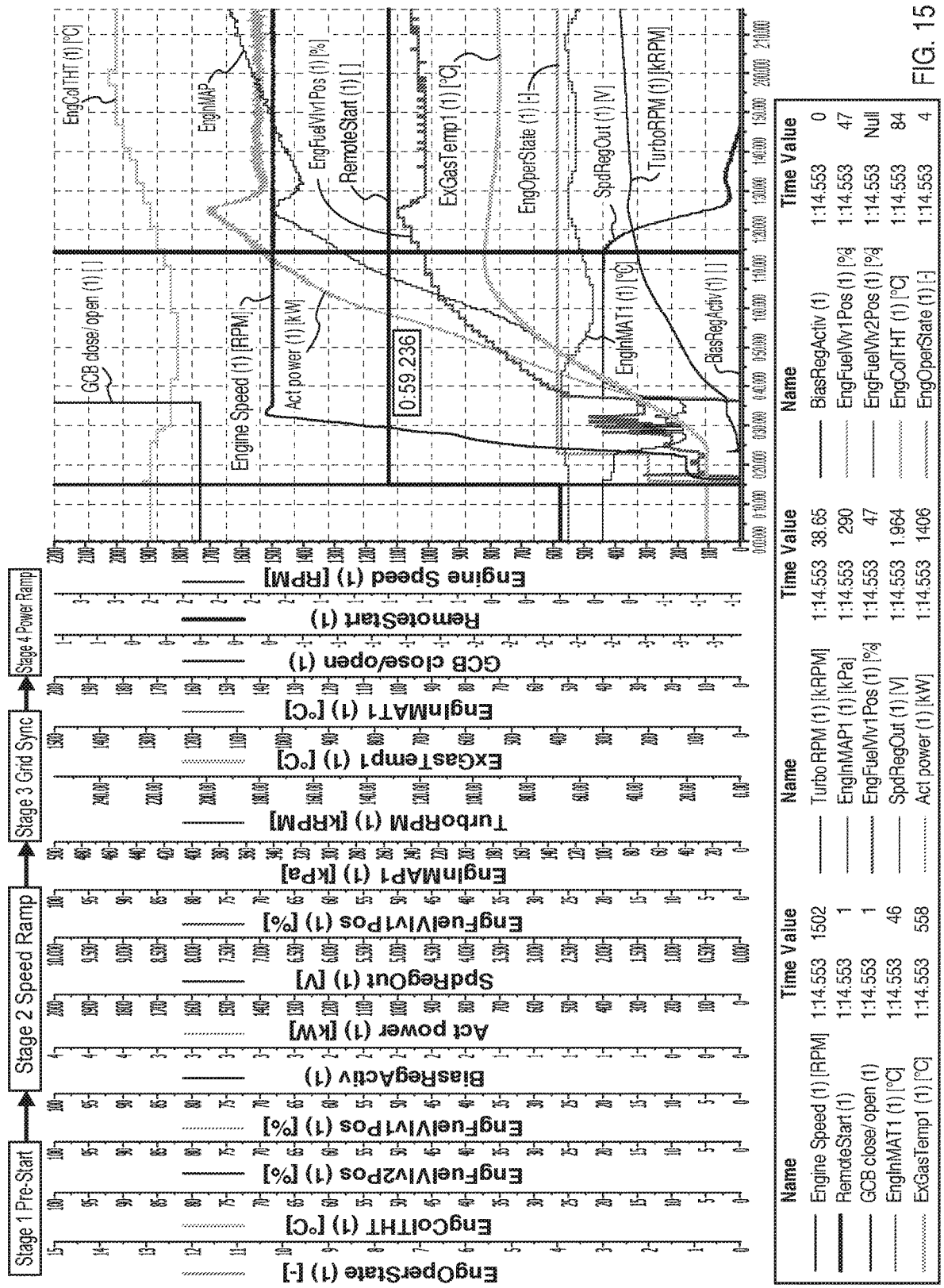
FIG. 15 is a plot of genset power vs time achieved for a genset which is operated using the various parameters described herein to achieve a cold start time of less than 60 seconds.

FIG. 15 is a plot of a cold startup time of the single turbocharger genset which is operated using the method 200. Briefly, the genset is lubricated with the lubricant at intervals of 5 minutes before genset startup; the fuel system is vented; the lubricant is heated to a temperature of greater than 50 degrees before genset startup; engine is accelerated continuously to a speed of 1,500 rpm without pausing at a lower speed; synchronization is performed using the fast synchronizing window and circuit breaker closing as described herein; fueling rate is increased and spark timing is retarded; the speed bias is controlled as a function of power being produced by the genset; the HT coolant is preheated to a temperature of greater than 80 degrees Celsius before genset startup; the LT coolant is preheated to a temperature of greater than 50 degrees Celsius before startup; and an ABB TA60 turbine nozzle ring is used in the single turbocharger genset. The cold startup time was 59.6 seconds which is significantly lower than a cold startup time experienced by single turbocharger gensets which are not operated using the method 200, 300 or any other methods described herein. Furthermore, the turbo exhaust flow, temperature, and resulting turbo RPM also increases continuously or monotonically which causes intake manifold pressure of the genset to also increase continuously or monotonically.

Figure 17:
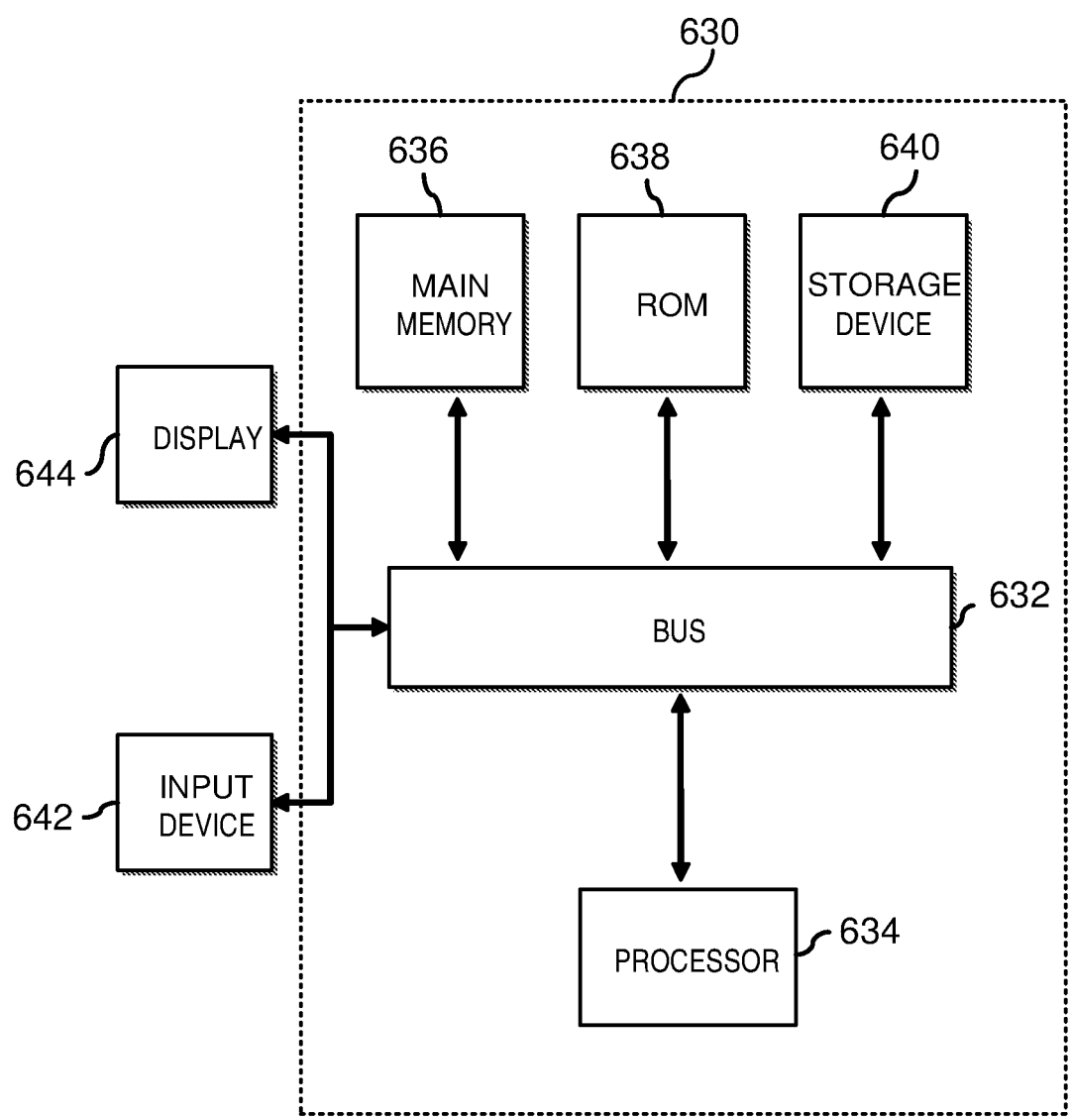
FIG. 17 is a schematic block diagram of a computing device which can be used as the controller of FIG. 1.

In some embodiments, the controller 170 or any of the controllers described herein can include a system computer of an apparatus or system which includes genset 100 or any other genset described herein. For example, FIG. 17 is a block diagram of a computing device 630 in accordance with an illustrative implementation. The computing device 630 can be used to perform any of the methods or the processes described herein, for example the method 200 or 300. In some embodiments, the controller 170 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include ROM 638 or other static storage device coupled to the bus 632 for storing static information and instructions for the processor 634. A storage device 640, such as a solid-state device, magnetic disk or optical disk, is coupled to the bus 632 for persistently storing information and instructions.

The computing device 630 may be coupled via the bus 632 to a display 644, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 200 or 300). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware circuitry and software.

Although an example computing device has been described in FIG. 17, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of reducing cold startup time of a genset for providing a requested power to a utility grid or load, the genset comprising an engine and a generator, the method comprising:
    determining if the genset is electrically coupled to a utility grid or load;
    in response to determining the genset is electrically coupled to the utility grid or load, controlling a speed bias value based on a difference between a target power output and a current power output of the genset in response to the power being produced by the genset; and
    controlling the power of the engine using the speed bias value.

2. The method of claim 1, further comprising:
    setting a speed bias upper limit to be in a range of +6% to +10%.

3. The method of claim 1, wherein controlling the speed bias includes initiating the speed bias value at a speed bias upper limit.

4. The method of claim 1, wherein the genset further comprises an exhaust system, the method further comprising:
determining if an exhaust system temperature of the exhaust system is below a predetermined temperature threshold; and
in response to determining the exhaust system temperature is below the predetermined temperature threshold and the generator is electrically coupled to the utility grid or load, controlling the speed bias value of the genset for ramping a genset power as in response to the power being produced by the genset.

5. The method of claim 4, further comprising:
in response to determining the exhaust system temperature is above the predetermined temperature threshold, controlling the speed bias value based on time.

6. The method of claim 4, wherein the predetermined temperature threshold is 400 degrees Celsius.

7. The method of claim 1, further comprising:
determining whether a power provided by the genset is equal to a target power; and
in response to determining the power provided by the genset being equal to the target power, controlling the speed bias value based on time.

8. The method of claim 3, further comprising:
reducing the speed bias value from the speed bias upper limit responsive to a power provided by the genset approaching a power requested of the genset, the reducing preventing the power provided by the genset from exceeding the power requested of the genset.

9. The method of claim 2, wherein the genset further comprises a single turbocharger and a throttle structured to selectively provide exhaust gas to the turbocharger for operating the turbocharger, and wherein the method further comprises:
maintaining the speed bias value within the speed bias upper limit in response to a time duration between the throttle opening and a corresponding increase in power provided by the turbocharger exceeding a predetermined time threshold.

10. The method of claim 1, further comprising:
providing a lubricant to the engine at predetermined time intervals before a genset startup.

11. The method of claim 1, further comprising:
heating a high temperature coolant of the genset to a predetermined high temperature coolant temperature.

12. A genset, comprising:
an engine;
a generator including a circuit breaker electrically coupleable to a utility grid or load;
a speed control system; and
a controller configured to:
determine if the genset is electrically coupled to the utility grid or load; and
in response to determining the genset is electrically coupled to the utility grid or load, generate speed bias data instructing the speed control system to control a speed bias value based on a difference between a target power output and a current power output of the genset in response to the power being produced by the genset; and
control the power of the engine using the speed bias value.

13. The genset of claim 12, wherein the controller is further configured to set a speed bias upper limit to be in a range of +6% to +10%.

14. The genset of claim 12, wherein controlling the speed bias includes initiating the value of the speed bias signal at a speed bias upper limit.

15. The genset of claim 12, wherein the genset further comprises an exhaust system, and wherein the controller is further configured to:
determine if an exhaust system temperature of the exhaust system is below a predetermined temperature threshold; and
in response to determining the exhaust system temperature or the turbocharger temperature is below the predetermined temperature threshold and the generator is electrically coupled to the utility grid or load, control the speed bias value in response to the power being produced by the genset.

16. The genset of claim 15, wherein the controller is further configured to:
in response to determining the exhaust system temperature is above the predetermined temperature threshold, control the speed bias value based on time.

17. The genset of claim 15, wherein the predetermined temperature threshold is 400 degrees Celsius.

18. The genset of claim 12, wherein the controller is further configured to:
determine whether a power provided by the genset is equal to a target power; and
in response to determining the power provided by the genset being equal to the target power, generating a second speed bias value based on time.

19. The genset claim 14, wherein the controller is further configured to reduce the value of the speed bias signal from the speed bias upper limit responsive to a power provided by the genset approaching a power requested of the genset, the reducing preventing the power provided by the genset exceeding the power requested of the genset.

20. The genset of claim 13, wherein the genset further comprises a single turbocharger and a throttle structured to selectively provide exhaust gas to the turbocharger for operating the turbocharger, and wherein the controller is further configured to:
maintaining the speed bias value within the speed bias upper limit in response to a time duration between the throttle opening and a corresponding increase in power provided by the turbocharger exceeding a predetermined time threshold.

21. The genset of claim 12, further comprising a lubricant system, and wherein the controller is further configured to generate a lubricant system control signal configured to cause the lubricant system to provide a lubricant to the engine at predetermined time intervals before genset startup.

22. The genset of claim 12, further comprising a high temperature coolant system, and wherein the controller is further configured to generate a high temperature coolant control signal configured to cause the high temperature coolant system to heat a high temperature coolant of the genset to a predetermined high temperature coolant temperature before genset startup.

23. A control device for reducing a cold start time of a genset, the genset comprising an engine, a generator including a circuit breaker electrically coupleable to a utility grid or load and a speed control system, the control device comprising:

a controller communicatively coupled to each of the generator, the circuit breaker and the speed control system, the controller comprising circuitry configured to:
- determine if the genset is electrically coupled to a utility grid or load; and
- in response to determining the genset is electrically coupled to the utility grid or load, generate speed bias data instructing the speed control system to control a speed bias value based on a difference between a target power output and a current power output of the genset in response to the power being produced by the genset; and control the power of the engine using the speed bias value.

24. The control device of claim 23, wherein the controller further configured to set a speed bias upper limit to be in a range of +6% to +10%.

25. The control device of claim 23, wherein the controller is configured to initiate the speed bias value at a speed bias upper limit.

* * * * *